United States Patent
Nair et al.

(10) Patent No.: US 9,658,545 B2
(45) Date of Patent: May 23, 2017

(54) POLYMERIC COMPOSITE MATERIALS, MANUFACTURE, AND USES

(71) Applicant: Eastman Kodak Company, Rochester, NY (US)

(72) Inventors: Mridula Nair, Penfield, NY (US); Joseph Salvatore Sedita, Albion, NY (US); Peter David Rollinson, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 14/867,062

(22) Filed: Sep. 28, 2015

(65) Prior Publication Data

US 2016/0018749 A1  Jan. 21, 2016

Related U.S. Application Data

(62) Division of application No. 14/057,251, filed on Oct. 18, 2013, now Pat. No. 9,176,405.

(51) Int. Cl.

| | |
|---|---|
| *G03G 9/00* | (2006.01) |
| *G03G 9/087* | (2006.01) |
| *G03G 9/097* | (2006.01) |
| *C08J 3/20* | (2006.01) |
| *G03G 9/08* | (2006.01) |
| *C09D 11/54* | (2014.01) |
| *G03G 9/093* | (2006.01) |
| *G03G 15/08* | (2006.01) |
| *G03G 13/01* | (2006.01) |

(52) U.S. Cl.
CPC ............. *G03G 9/081* (2013.01); *C08J 3/20* (2013.01); *C09D 11/54* (2013.01); *G03G 9/08* (2013.01); *G03G 9/087* (2013.01); *G03G 9/0819* (2013.01); *G03G 9/0821* (2013.01); *G03G 9/0825* (2013.01); *G03G 9/08711* (2013.01); *G03G 9/08755* (2013.01); *G03G 9/08766* (2013.01); *G03G 9/08777* (2013.01); *G03G 9/08795* (2013.01); *G03G 9/08797* (2013.01); *G03G 9/093* (2013.01); *G03G 9/09385* (2013.01); *G03G 13/013* (2013.01); *G03G 15/08* (2013.01)

(58) Field of Classification Search
CPC .... G03G 9/081; G03G 15/08; G03G 9/08711; G03G 9/08755; G03G 9/08766; G03G 9/0877; G03G 9/0825; G03G 9/0819; G03G 9/08
See application file for complete search history.

(56) References Cited

U.S. PATENT DOCUMENTS

| | | | |
|---|---|---|---|
| 4,112,176 | A | 9/1978 | Bailey |
| 7,965,961 | B2 | 6/2011 | Priebe et al. |
| 8,147,948 | B1 | 4/2012 | Tyagi et al. |
| 2010/0305239 | A1 | 12/2010 | Wei et al. |
| 2011/0200360 | A1 | 8/2011 | Tyagi et al. |
| 2011/0200932 | A1 | 8/2011 | Tyagi et al. |
| 2011/0200933 | A1 | 8/2011 | Tyagi et al. |
| 2012/0100479 | A1 | 4/2012 | Aslam et al. |
| 2013/0029102 | A1 | 1/2013 | Landry-Coltrain et al. |

OTHER PUBLICATIONS

Ming Lu, "Design and Preparation of Cross-Linked Polystyrene Nanoparticles for Elastomer Reinforcement," Mar. 31, 2010, pp. 1-8, Journal of Nanomaterials, vol. 2010, Article ID 352914.

*Primary Examiner* — Thorl Chea
(74) *Attorney, Agent, or Firm* — J. Lanny Tucker

(57) ABSTRACT

Composite materials such as composite particles have a solid non-elastomeric continuous phase made of an organic polymer having a glass transition temperature of at least 25° C. Dispersed within this solid non-elastomeric continuous phase are many multi-compartment porous chemically crosslinked elastomeric particles that have a mode particle size of at least 1 μm and up to and including 10 μm. The composite particles can be used as toner particles in electrophotographic imaging methods to provide fused toner images and especially stacked fused toner images.

12 Claims, 3 Drawing Sheets

POLYMERIC COMPOSITE MATERIALS, MANUFACTURE, AND USES

CROSS-REFERENCE TO RELATED APPLICATIONS

This application is a divisional of prior U.S. Pat. No. 9,176,405, issued on Nov. 3, 2015, which is hereby incorporated herein by reference in its entirety.

FIELD OF THE INVENTION

This invention relates to composite particles that comprise multi-compartment porous chemically crosslinked elastomeric particles distributed within an organic non-elastomeric polymer matrix. These composite particles are useful as toners for various imaging processes including electrophotographic imaging methods. The multi-compartment porous chemically crosslinked elastomeric particles can be prepared using a water-in-oil-in-water double emulsion and the composite particles can be prepared by melt blending such elastomeric particles with the organic non-elastomeric polymer to form a composite material.

BACKGROUND OF THE INVENTION

One common method for printing images on a receiver material is referred to as electrophotography. The production of black-and-white or color images using electrophotography generally includes the production of a latent electrostatic image by uniformly charging a dielectric member such as a photoconductive substance, and then discharging selected areas of the uniform charge to yield an electrostatic charge pattern with a desired image. Such discharge is generally accomplished by exposing the uniformly charged dielectric member to actinic radiation provided by selectively activating particular light sources in an LED array or a laser device directed at the dielectric member. After the imagewise charge pattern is formed, it is "developed" into a visible image using pigmented or non-pigmented marking particles (generally referred to as "toner particles") by using either the charge area development (CAD) method or the discharge area development (DAD) method, which marking particles provide an opposite charge to the dielectric member and are brought into the vicinity of the dielectric member so as to be attracted to the imagewise charge pattern.

Thereafter, a suitable receiver material (for example, a cut sheet of plain bond paper) can be brought into juxtaposition with a toner image that has been formed with the toner particles in accordance with the imagewise charge pattern on the dielectric member, either directly or by using an intermediate transfer member. A suitable electric field is applied to transfer the toner particles to the receiver material in the imagewise pattern to form the desired print image on the receiver material. The receiver material is then removed from its operative association with the dielectric member and subjected to suitable heat or pressure or both heat and pressure to permanently fix (also known as fusing) the toner image (containing toner particles) to form the desired image on the receiver material.

Plural toner particle images of, for example, including colored toner particle images, can be overlaid with multiple toner transfers to the receiver material, followed by fixing all toner particles to form a multi-color image in the receiver material. Toners that are used in this fashion to prepare multi-color images are generally Cyan (C), Yellow (Y), Magenta (M), and Black (K) toners containing appropriate dyes or pigments to provide the desired colors or tones.

Porous polymeric particles have been prepared and used for many different purposes including the use as toner particles. In addition, porous particles have been described for use in chromatographic columns, ion exchange and adsorption resins, drug delivery devices, cosmetic formulations, papers, and paints. The methods for generating pores in polymeric particles are well known in the field of polymer science. However, each type of porous particle often requires unique methods for its manufacture.

Chemically-crosslinked elastomeric porous particles have been prepared for laser-engraveable compositions comprising such particles dispersed within a laser-engraveable elastomeric resin. The presence of these porous particles, which can include an infrared radiation absorber, improves various imaging and performance properties in the preparation of flexographic printing members such as flexographic printing plates and printing sleeves.

In the early days of electrophotographic printing, toner particles were relatively large (for example on the order of 10-15 μm). As a result, the print image had a tendency to exhibit a relief appearance (that is, a variably raised surface). Under most circumstances, the relief appearance was considered an objectionable artifact in the printed image. In order to improve image quality and to reduce the relief appearance, smaller toner particles (less than 8 μm) have since been prepared and used more commonly.

In recent years, there has been a desire to provide multi-dimensional or raised relief toner images so that text or shapes can have a relief appearance that is useful for various purposes. For such purposes a large particle toner having toner particle sizes on the order of greater than about 20 μm or larger is beneficial. In particular, such large particle toners allow larger toner stacks to be created to allow the formation of relief patterns on a substrate.

The desire to use larger toner particles for making multi-dimensional images comes from the interest in generating relief patterns in a way that achieves maximal applied height in a single pass through a printing module.

U.S. Pat. No. 7,965,961 (Priebe et al.) describes electrophotographic printing a raised multi-dimensional toner shape on a receiver member using predetermined sized toner particles such as substantially larger size or alternatively utilizing predetermined sized toner particles having predetermined properties. For example, FIG. 5 of the noted patent illustrates a multi-dimensional toner shape in an image using stacks of the same specific sized toner particles in a particular packing density. Moreover, in FIG. 7, multi-dimensional toner shape is provided in an image using stacks of different sized toner particles to result in greater packing of the toner particles.

U.S. Patent Application Publication 2011/0200360 (Tyagi et al.) describes a method and related apparatus for producing electrophotographic prints with raised letters with height in excess of 100 μm but achieving the raised letter height by multiple applications of toner particles and fusing.

Moreover, U.S. Pat. No. 8,147,948 (Tyagi et al.) describes a method for providing electrophotographic images using a first toner image using relatively small first toner particles followed by printing a second toner image using relatively large second toner particles. U.S. Patent Application Publication 2012/0100479 (Aslam et al.) describes similar methods.

Raised electrophotographic toner images are also provided using multiple layers of small toner particles as described in U.S. Patent Application 2011/0200933 (Tyagi et al.).

While the described methods have provided improvements in the art, there is a need for further improvement. Many of the known methods require multiple passes in the electrophotographic imaging apparatus (multiple formation of toner images) to achieve the desired toner image height. In particular, it will be understood that larger toner particles are difficult to transfer causing toner images made with larger particles to have poor resolution and high granularity. One reason for this is that the Coulombic repulsion between large toner particles causes such larger toner particles to fly apart during transfer thus degrading image quality. This effect is known in the art as dot explosion. In addition, it will be appreciated that the amount of large diameter toner particles that can be developed is limited due to higher charge levels required to transfer such large diameter toner particles. Such challenges associated with transferring large diameter toner particles limit the amount of large diameter toner particles that can be transferred during a single pass and also causes a lack of coherency in the large diameter toner particles that are transferred. These effects, in turn, limit the height of a toner stack that can be formed using large diameter toner particles in a single toner transfer operation. In addition, an image consisting of many toner layers can be difficult to fuse completely, leading to toner offset in the press, cohesive failure somewhere within the toner stack, or marginal-to-poor adhesion of the fused toner image. High toner stacks, coupled with incomplete fusing, can also be prone to brittle fracture (due to poor cohesive strength) when the image is flexed or bent slightly. It is therefore desirable to provide a toner that can have limited toner melt flow by controlling deformation under fusing pressure thereby maintaining stack height and minimizing the number of passes through the imaging apparatus required to get the desired stack height in order to enable the creation of relief patterns. Such raised patterns can be used for any number of structural or aesthetic purposes, including but not limited to providing areas with distinct tactile feel on an image, for creating Braille texts, for providing containment structures for example for fluids, for forming structural and optical elements on the surface of a receiver element. In addition to using multi-dimensional imaging for decorative accents in greeting cards and specialty printing applications, it can be useful for preparing corrugated board by fusing together stacks of regular paper printed with such toners in a cross hatch pattern and for making card stock from standard papers useful as receiver elements. Further, it is desirable to allow the creation of such relief images that are more resilient to bending and flexing.

SUMMARY OF THE INVENTION

To address the noted problems, the present invention provides a composite material comprising a solid non-elastomeric continuous phase comprising an organic polymer having a glass transition temperature of at least 25° C., and having dispersed within the solid non-elastomeric continuous phase, a plurality of multi-compartment porous chemically crosslinked elastomeric particles that have a mode particle size of at least 1 µm and up to and including 10 µm.

In many preferred embodiments, the composite material of the present invention is a composite particle comprising the solid non-elastomeric continuous phase comprising the organic polymer and an external particle surface, the composite particle having a mode particle size of at least 10 µm to and including 100 µm, and having dispersed within the solid non-elastomeric continuous phase, the plurality of multi-compartment porous chemically crosslinked elastomeric particles.

This invention also provides a method for preparing composite particles, the method comprising:

melt blending one or more non-elastomeric organic polymers having a glass transition temperature of at least 25° C. with a plurality of multi-compartment porous chemically crosslinked elastomeric particles that have a mode particle size of at least 1 µm to and including 10 µm, to form a composite blend, and grinding the composite blend to form composite particles, each composite particle comprising a solid non-elastomeric continuous phase comprising an organic polymer and an external particle surface, the composite particle having a mode particle size of at least 10 µm to and including 100 µm, and having dispersed within the solid non-elastomeric continuous phase, a plurality of the multi-compartment porous chemically crosslinked elastomeric particles that have a mode particle size of at least 1 µm to and including 10 µm.

In other embodiments, a method of this invention for forming an electrophotographic toner image, comprises:

applying a layer of composite particles of the present invention to a substrate in an imagewise fashion to form a non-fused toner image on the substrate, applying the same composite particles one or more times on the non-fused toner image to form a multi-dimensional toner image of the composite particles, and fusing the multi-dimensional toner image of composite particles to form a fused multi-dimensional toner image on the substrate, wherein each composite particle comprises a solid non-elastomeric continuous phase comprising an organic polymer and an external particle surface, the composite particle having a mode particle size of at least 10 µm to and including 100 µn, and having dispersed within the solid continuous phase, a plurality of multi-compartment porous chemically crosslinked elastomeric particles that have a mode particle size of at least 1 jam to and including 10 µm.

Moreover, a method for forming a toner image, comprises:

applying a layer of composite particles of the present invention to an electrostatic image on a primary toner receiver to form a non-fused toner image on the primary toner receiver, transferring the composite particles in the non-fused toner image from the primary toner receiver to a final receiver material, fusing the composite particles on the final receiver material, repeating the foregoing applying, transferring, and fusing features using the same composite particles one or more times where necessary to form a fused multi-dimensional toner image on the final receiver material, wherein each composite particle comprises a solid non-elastomeric continuous phase comprising an organic polymer and an external particle surface, the composite particle having a mode particle size of at least 10 µm to and including 100 µm, and dispersed within the solid continuous phase, a plurality of multi-compartment porous chemically crosslinked elastomeric particles that have a mode particle size of at least 1 µm to and including 10 µm.

The present invention provides a number of advantages, such as providing composite toner particles that can be used to provide multi-dimensional toner images in less number of passes than is needed with conventional large diameter toner particles. The advantages are achieved because the inventive composite particles comprise a non-elastomeric continuous phase and a plurality of multi-compartment porous chemically crosslinked elastomeric particles uniformly distributed within the solid non-elastomeric continuous phase. This choice of materials for making the composite particles reduces adverse effects from fusing of toner images at a desired temperature and limits particle melt flow during fusing. The presence of some percentage of multi-compartment porous chemically crosslinked elastomeric particles that act as a filler reduces the amount of "flowable" material present and therefore reduces the total flow of the individual composite particle. Porous fillers further restrict flow since the pores can alter the thermal conductivity of the composite. Thus, the height of a stack of composite particles can be maintained more readily in a multi-dimensional toner image using less number of passes. The noted elastomeric polymer particles also toughen the composite particles by serving as energy absorbers and crack terminators. Their presence reduces the brittleness of the fused toner image and the tendency of the fused toner image to crack when the substrate is flexed or bent slightly, thus making the fused toner image more resilient.

Because the composite particles of the present invention contain multi-compartment porous chemically crosslinked elastomeric particles, the overall mass of each composite particle is reduced which in turn reduces toner particle charge and required fusing energy, and enhances toner particle transfer to receiver elements.

DETAILED DESCRIPTION OF THE INVENTION

Definitions

Figure 1:
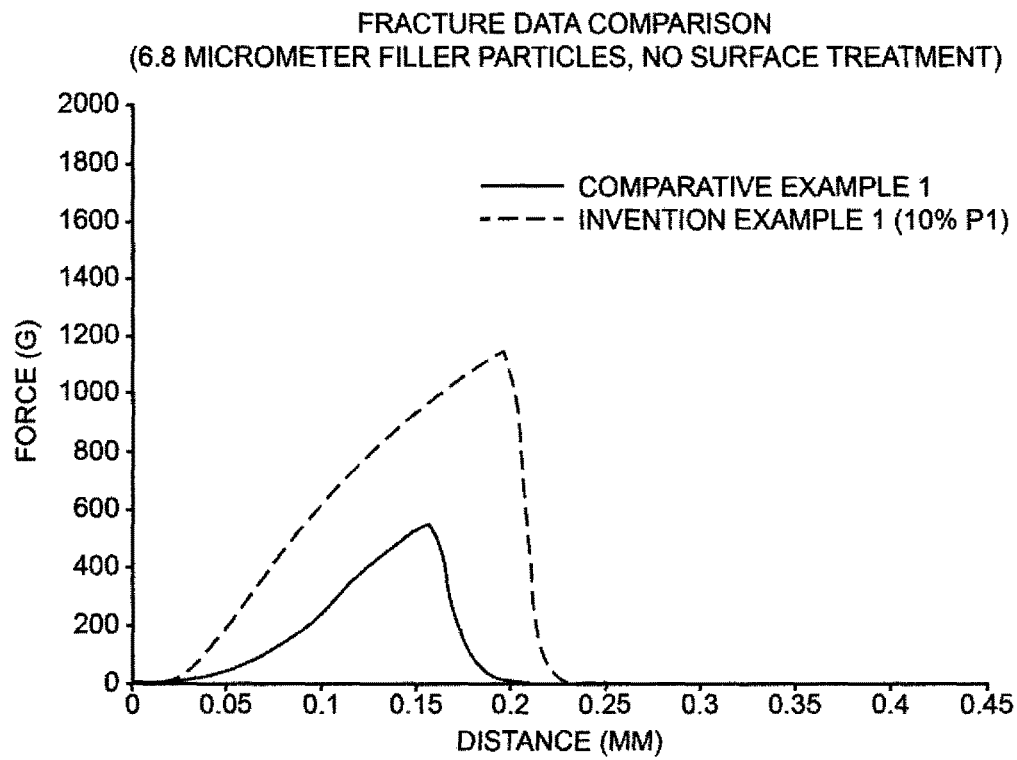
FIG. 1 is a graphical representation of fracture data (force in grams vs. distance in mm) for compression molded disks prepared from composite particles of the present invention (without surface treatment) and compression molded disks prepared from comparative particles outside the present invention, as described in Invention Example 1 presented below.

As used herein to define various components of the composite materials, composite particles, multi-compartment porous chemically crosslinked elastomeric particles, formulations, and manufacturing methods, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

The terms "multi-compartment porous chemically crosslinked elastomeric particle" or "multi-compartment porous chemically crosslinked elastomeric particles" are used herein, unless otherwise indicated, to refer to materials used to prepare the composite materials of the present invention. As described below, the composite materials comprise a solid continuous non-elastomeric (polymer) phase having an external particle surface and a plurality (two or more) of the multi-compartment porous chemically crosslinked elastomeric particles dispersed within the solid non-elastomeric continuous phase.

The multi-compartment porous chemically crosslinked elastomeric particles include "micro," "meso," and "macro" compartment (pores), which according to the International Union of Pure and Applied Chemistry, are the classifications recommended for compartments (pores) less than 2 nm, from 2 to 50 nm, and greater than 50 nm, respectively. These particles can include closed compartments of all sizes and shapes (that is, compartments entirely within the solid continuous phase). While there may be open compartments on the outer particle surface, such open compartments are not generally desirable.

The term "chemical crosslinking" refers to the instance when components of a composition are crosslinked by chemical bonds resulting from a chemical reaction that is initiated by heat, pressure, change in pH, or exposure to actinic radiation. Chemical crosslinks are bonds that link one polymer chain to another and involve joining together two or more polymer molecules with chemical or covalent bonds that are strong. Chemical crosslinking results in a rapid increase in molecular weight and a corresponding increase in melt viscosity. These crosslinks promote a difference in the physical properties of the polymeric material. When a polymer is said to be "chemically crosslinked," it usually means that the entire bulk of the polymer has been exposed to a crosslinking method. Chemical crosslinking can also be induced in materials that are normally thermoplastic through exposure to a radiation source, such as an electron beam, gamma-radiation, or UV radiation. The crosslinking reaction can be thermally induced, for example as in the formation of thermosetting elastomers, such as urethanes or epoxy resin, or in the reaction of compounds containing multiple ethylenically unsaturated groups, such as acrylates, or in the vulcanization of rubbers using either sulfur-containing or peroxide curing agents, or it can be photochemically induced, for example as in the reaction of acrylates containing multiple ethylenically unsaturated groups, or by the way of free-radical initiated reactions.

The term "elastomeric" refers to a material that is an elastomer. An elastomer is typically a polymer resin that is chemically crosslinked for the present invention, and exists above its glass transition temperature, so that it has a notably low Young's modulus and a high yield strain and elongation to break compared with other materials. An elastomeric material can undergo significant elongation below its elastomeric limit without breaking and will return reversibly to its original form after the force is removed.

A "non-elastomeric" material conversely does not have the noted properties described for an elastomeric material.

The term "final receiver material" refers to any element or substrate that can be receive and display a toner image according to the present invention.

Unless otherwise indicated, the term "weight %" refers to the amount of a component or material based on the total dry weight of the composition, particle, or layer in which it is located.

The term "electrostatic printing process" as used herein refers to printing methods including but not limited to, electrophotography and direct, solid dry toner printing as described herein. As used in this invention, electrostatic printing means can also include the use of liquid toners to form images on receiver materials.

The term "multi-dimensional toner image" as used herein refers to a non-fused or fused toner image that comprises multiple layers of the same composite particles (toner particles) on top of one another, for example as shown in FIGS. 6 and 7 of U.S. Pat. No. 7,965,961 (Priebe et al.). There are sufficient layers of toner particles so that the eventual fused toner image has 3-D or raised effect and the raised nature can be felt by human touch.

For any particles described herein, mode particle size can be measured for example, by automated image analysis and flow cytometry using any suitable equipment designed for this purpose. The mode particle size represents the most frequently occurring diameter for spherical multi-compartment chemically-crosslinked elastomeric particles and the most frequently occurring largest diameter for the non-spherical multi-compartment chemically-crosslinked elastomeric particles in a particle size distribution histogram.

Composite Materials

The composite materials of the present invention have a number of uses in various industries. For example, such uses include but are not limited to, plastic containers, automotive dashboard components, blister packs, and reinforced plastic fibers. Particularly advantageous composite particles can be used as toner particles in electrophotographic imaging methods, but other uses include but are not limited to, vehicles for drug and fragrance delivery, mold release agents and components for low cost sensors.

The composite materials of the present invention, including the composite particles of this invention, have several very useful physical properties. For example, the amount of flow of the composite material at 90 C (as measured by the ratio of the material's loss modulus to its storage modulus, or Tan delta as described below with the Examples) is at least 10% less than that of the organic polymer used in the composite material but which contains none of the multi-compartment porous chemically crosslinked elastomeric particles described herein. In many embodiments, the Tan delta is at least 3% and up to and including 35% less than the noted ratio of the organic polymer.

In many embodiments, the composite material fracture resistance (the force required to initiate brittle fracture in compression molded samples of similar thickness) at 20° C. can be as much as 50% greater than the fracture resistance of the organic polymer used in the composite material but which contains none of the multi-compartment porous chemically crosslinked elastomeric particles described herein.

The material fracture resistance can be determined at 20° C. using a small bench top load frame equipped with a 0.2 mm diameter spheroconical probe is used to apply pressure at a controlled rate to a compression molded sample of the composite material.

The composite particles of this invention generally have a mode particle size of at least 10 μm and up to and including 100 μm, or typically at least 10 μm and up to an including 50 μm.

The composite particles of this invention can have any desirable shape. Most of them are not necessarily spherical. The shape of the composite particles can be characterized by an "aspect ratio" that is defined as the ratio of the largest perpendicular length to the longest length of the composite particle. These lengths can be determined for example by optical measurements using a commercial particle shape analyzer such as the Sysmex FPIA-3000 (Malvern Instruments). For example, composite particles are considered "spherical" when they have an aspect ratio of at least 0.95 and up to and including 1. For the non-spherical composite particles, the aspect ratio can be as low as 0.1 and up to and including 0.95, and in some embodiments, the aspect ratio can be 0.95 and down to and including 0.4. In general, the composite particles can be irregular in shape and when a plurality of composite particles is included for a particular use, the plurality of composite particles can be quite diverse in their individual shapes.

The composite materials (including the composite particles) comprise one or more organic polymers (described below) as an essential component, which organic polymers individually and collectively have a glass transition temperature ($T_g$) of at least 25° C. and generally of at least 40° C. and up to and including 120° C. Glass transition temperature is determined using the method of differential scanning calorimetry (DSC) at a scanning rate of 20° C./minute and the onset in the change in heat capacity is taken as the $T_g$.

The composite materials comprise a solid non-elastomeric continuous phase comprising one or more organic polymers that have the requisite properties, for example, that provide non-elastomeric properties to the solid non-elastomeric continuous phase. Useful organic polymers can be chosen from any of the following classes of organic polymer including but not limited to, polyesters, styrene-acrylic copolymers (such as copolymers derived at least in part from styrene or a styrene derivative and an acrylate or methacrylate), cellulosic polymers, polyamides, and polyimides. More particularly, such polymers include but are not limited to, organic homopolymers and organic copolymers that are polyesters, styrenic polymers (for example polystyrene and polychlorostyrene), mono-olefin polymers (for example, organic polymers formed from one or more of ethylene, propylene, butylene, and isoprene), vinyl ester polymers (for example, polymer formed from one or more of vinyl acetate, vinyl propionate, vinyl benzoate, and vinyl butyrate), organic polymers formed from one or more α-methylene aliphatic mono-carboxylic acid esters (for example, organic polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as organic polymers formed from one or more of vinyl methyl ether, vinyl ethyl ether, and vinyl butyl ether), and vinyl ketone polymers (for example, organic polymers formed from one or more of vinyl methyl ketone, vinyl hexyl ketone, and vinyl isopropenyl ketone). Particularly useful organic polymers include polystyrenes (including polymers of styrene derivatives), polyesters, styrene-alkyl acrylate copolymers, styrene-alkyl methacrylate copolymers, styrene-acrylonitrile copolymers, styrene-butadiene copolymers, styrene-maleic anhydride copolymers, polyethylene resins, and polypropylene resins. Other useful organic polymers include polyurethanes, urethane acrylic copolymers, epoxy resins, silicone resins, polyamide resins, and modified rosins. Still other useful organic polymers are polyesters of aromatic or aliphatic dicarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides.

In most embodiments, the solid non-elastomeric continuous phase of the composite particles uniformly has the same composition. Thus, the solid non-elastomeric continuous phase is uniform in composition including any additives that are incorporated into the organic polymer. In addition, if mixtures of organic polymers are used, those mixtures are dispersed uniformly throughout the solid non-elastomeric continuous phase.

The organic polymers used are generally present in the solid non-elastomeric continuous phase in an amount of at least 70 weight % and up to and including 97 weight %, or more typically at least 80 weight % and up to and including 95 weight %.

The other essential component of the composite materials (including composite particles) is the plurality of multi-compartment porous chemically crosslinked elastomeric particles that have a mode particle size of at least 1 µm and up to and including 10 µm or typically at least 2 µm and up to and including 8 µm.

Such multi-compartment porous chemically crosslinked elastomeric particles are generally present in the composite materials (including composite particles) in an amount of at least 3 weight % and up to and including 30 weight %, or typically at least 5 weight % and up to and including 20 weight %, all based on the total composite material dry weight.

The multi-compartment (two or more), chemically-crosslinked elastomeric particles used in the practice of this invention are generally prepared, as described below, using a water-in-oil-water double emulsion which comprises optionally, multiple water-in-oil emulsions, in combination with an aqueous suspension process, such as in the ELC process, and a polymerization of the ethylenically unsaturated polymerizable monomers of the oil phase. One or more water-in-oil emulsions can be originally prepared and used to provide two or more discrete compartments in the chemically-crosslinked elastomeric particles.

The multi-compartment porous chemically-crosslinked elastomeric particles comprise a chemically-crosslinked elastomeric phase, an external particle surface, and discrete compartments (for example, first, second, and additional different discrete sets of compartments) dispersed within the chemically crosslinked elastomeric phase.

In many embodiments, the chemically-crosslinked elastomeric phase of the multi-compartment porous chemically-crosslinked elastomeric particles has the same composition. That is, the chemically-crosslinked elastomeric phase is uniform in composition including any additives (as described below) that can be incorporated therein. In addition, if mixtures of chemically crosslinked organic polymers are present in the chemically-crosslinked elastomeric phase, those chemically crosslinked organic polymer mixtures are dispersed uniformly throughout the multi-compartment, chemically-crosslinked elastomeric particles.

The multi-compartment porous chemically-crosslinked elastomeric polymer(s) generally has a glass transition temperature of less than or equal to 20° C.

The multi-compartment porous chemically crosslinked elastomeric particles can include the same type of compartments that have little or no difference in incorporated marker materials. In some embodiments, the multi-compartment porous chemically crosslinked elastomeric particles comprise first and second discrete compartments, some of which can be empty or some of which can contain a single marker material within the volume of the compartment.

The terms "first discrete compartment" and "second discrete compartment" refer to different isolated compartments (pores) in the multi-compartment porous chemically-crosslinked elastomeric particle. First and second discrete compartments can refer to distinct individual compartments (pores), or in some embodiments, they refer to distinct sets of compartments. Each set of compartments includes a plurality of compartments, which compartments are isolated from each other, and the compartments of each set of compartments are isolated from all other compartments of the other sets of compartments in the multi-compartment porous chemically-crosslinked elastomeric particles. The word "discrete" is also used to define different droplets of the first and second aqueous phases when they are suspended in the oil phase (described below).

The size of the multi-compartment porous chemically-crosslinked elastomeric particles, the formulation, and manufacturing conditions are the primary controlling factors for compartment size. However, typically the discrete compartments generally have an average size of at least 100 nm (0.1 µm) and up to and including 4000 nm (4 µm), or more likely at least 100 nm (0.1 µm) and up to and including 2000 nm (2 µm). The discrete compartments (for example, the first and second discrete compartments) can have the same or different average sizes. Compartment size can be determined by analyzing Scanning Electron Microscopy (SEM) images of fractured multi-compartment, chemically-crosslinked elastomeric particles using a commercial statistical analysis software package to study the distribution of the compartments within the multi-compartment, chemically-crosslinked elastomeric particles, or by manually measuring the compartment diameters using the scale in the SEM images. For example, the "average" compartment size can be determined by calculating the average diameter of 20 measured compartments.

The multi-compartment porous chemically crosslinked elastomeric particles used in this invention can be spherical or non-spherical depending upon the desired use in the composite materials. The shape of the particles can be characterized by an "aspect ratio" that is defined as the ratio of the largest perpendicular length to the longest length of the multi-compartment porous chemically crosslinked elastomeric particle. These lengths can be determined for example by optical measurements using a commercial particle shape analyzer such as the Sysmex FPIA-3000 (Malvern Instruments). For example, multi-compartment porous chemically crosslinked elastomeric particles that are considered "spherical" can have an aspect ratio of at least 0.95 and up to and including 1. For the non-spherical multi-compartment porous chemically crosslinked elastomeric particles, the aspect ratio can be as low as 0.1 and up to and including 0.95, and in some embodiments, the aspect ratio can be 0.95 and down to and including 0.4.

The multi-compartment porous chemically-crosslinked elastomeric particles used in this invention can also have small colloidal inorganic particles on the external particle surfaces. These colloidal inorganic particles can be interspersed on the external particle surfaces or they can be arranged in a pattern or entirely cover the external particle surfaces in a layer. Such colloidal inorganic particles can be composed of for example, colloidal silica, colloidal alumina, colloidal titania, clay particles, or mixtures thereof. These colloidal inorganic particles can be individual particles, or aggregates of particles, ranging in particle or aggregate size of at least 5 nm and up to and including 2 µm.

In general, the multi-compartment porous chemically-crosslinked elastomeric particles generally have porosity of at least 10% and up to and including 80%, or more likely at least 10% and up to and including 50%, or typically at least 10% and up to an including 30%, all based on the total multi-compartment, chemically-crosslinked elastomeric particle volume. Porosity can be measured by the mercury intrusion technique or a time-in-flight method.

The discrete compartments (such as first and second discrete compartments) can also comprise pore stabilizing hydrocolloids that are described below. If both the first and second discrete compartments are present, they can have the same or different stabilizing hydrocolloids. In most instances, the same pore stabilizing hydrocolloid is used throughout the multi-compartment porous chemically-crosslinked elastomeric particles.

The discrete compartments can also incorporate other additives such as colorants, waxes, and other functional materials described below depending in the end use.

The composite particles can comprise various addenda that are not essential to the use of the present invention but which can provide additional desirable properties. For example, the composite particles can further comprise flow additive particles, a surface treatment agent (or surface stabilizing agents), spacing treatment agent particles, or a combination thereof, on the outer surface of each composite particle. Such materials are known in the electrophotographic art.

Other non-essential but desirable components in the composite materials including in the composite particles include, various colorants or other additive markers of some type, in amounts that would be readily apparent to one skilled in the art for a particular use. Such colorants or markers can be present in one or more locations in the composite materials. Thus, these non-essential components can be present within the solid non-elastomeric continuous phase, the chemically crosslinked organic solid phase of the multi-compartment porous chemically crosslinked elastomeric particles, or the one or more compartments of such multi-compartment porous chemically crosslinked elastomeric particles. Alternatively, the colorant or other additive markers can be present in multiple locations in the composite materials.

Useful colorants include but are not limited to, those described in U.S. Reissue Pat. 31,072 (Jadwin et al.) and in U.S. Pat. No. 4,160,644 (Ryan), and U.S. Pat. No. 4,416,965 (Sandhu et al.), U.S. Pat. No. 4,414,152 (Santilli et al.), such as carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1, and C.I. Pigment Blue 15:3. Other useful colorants are described in U.S. Pat. No. 5,385,803 (Duff et al.) and EP 2,025,525 (Wosnick et al.) the disclosures of which are incorporated herein by reference. The amounts of such colorants can be at least 0.01 weight % based on the total composite material dry weight.

Other classes of additive markers useful in the practice of this invention include but are not limited to, different fluorescing materials, radioisotopes, particles of metals and metal-containing compounds (such as metal oxides, metal sulfides, and metal oxyhydroxides) having different magnetic moments, luminescing compounds, as well as bioactive materials.

Examples of useful fluorescing additive markers include but are not limited to, compounds that absorb radiation (excite) in the UV and visible regions of the electromagnetic spectrum but then emit or fluoresce in the infrared or visible region of the electromagnetic spectrum. Other useful fluorescing additive markers absorb radiation (excite) in the infrared region and also fluoresce in the infrared region. Still other fluorescing additive markers absorb (excite) in the infrared region and fluoresce in the visible region. Fluorescent light activated dyes can be invisible to or exhibit one color under ambient light conditions and a second color under fluorescent light conditions. Fluorescent dyes are known to the person skilled in the art. Examples of such compound include but are not limited to, coumarins, perylenes, naphthalimides, cyanines including metal phthalocyanines and metal naphthocyanines, xanthenes, oxazines, anthracene, naphthacene, anthraquinone, and thiazine dyes and derivatives thereof so as to make them water-soluble or water-dispersible.

Inorganic or organic non-fluorescing colorants (pigments or dyes) can be present in the composite particles designed for use as toner particles in electrophotography, to provide any suitable color, tone, or hue.

Such non-fluorescing colorants can be incorporated into the organic polymers in known ways. Useful colorants or pigments include but are not limited to the following compounds: titanium dioxide, carbon black, Aniline Blue, Calcoil Blue, Chrome Yellow, Ultramarine Blue, DuPont Oil Red, Quinoline Yellow, Methylene Blue Chloride, Malachite Green Oxalate, Lamp Black, Rose Bengal, Colour Index Pigment Red 48:1, Colour Index Pigment Red 57:1, Colour Index Pigment Yellow 97, Colour Index Pigment Yellow 17, Colour Index Pigment Blue 15:1, Colour Index Pigment Blue 15:3, phthalocyanines such as copper phthalocyanine, mono-chlor copper phthalocyanine, hexadecachlor copper phthalocyanine, Phthalocyanine Blue or Colour Index Pigment Green 7, and quinacridones such as Colour Index Pigment Violet 19 or Colour Index Pigment Red 122, and pigments such as HELIOGEN Blue™, HOSTAPERM Pink™, NOVAPERM Yellow™, LITHOL Scarlet™, MICROLITH Brown™, SUDAN Blue™, FANAL Pink™, and PV FAST Blue™. Mixtures of colorants can be used. Other suitable non-fluorescing colorants are described in U.S. Reissue Pat. 31,072 (noted above) and U.S. Pat. No. 4,160,644 (Ryan), U.S. Pat. No. 4,416,965 (Sandhu et al.), and U.S. Pat. No. 4,414,152 (Santilli et al.), all of which are incorporated herein by reference.

For example, such colorants can be in principle any of the colorants described in the Colour Index, Vols. I and II, $2^{nd}$ Edition (1987) or in the Pantone® Color Formula Guide, $1^{st}$ Edition, 2000-2001. The choice of particular colorants for dry toner particles is well described in the art, for example in the proceedings of *IS&T NIP* 20: International Conference on Digital Printing Technologies, IS&T: The Society for Imaging Science and Technology, 7003 Kilworth Lane, Springfield, Va. 22151 USA ISBM: 0-89208-253-4, p. 135. Carbon black is generally useful as the black toner colorant while other colorants for the CYM color toners include but are not limited to, red, blue, and green pigments, respectively. Specific colorants can include copper phthalocyanine and Pigment Blue that can be obtained as Lupreton Blue™ SE1163.

The composite materials (including composite particles) can further comprise colorless fluorescent dyes as described for example, in U.S. Patent Application Publication 2010/0164218 (Schulze-Hagenest et al.).

Examples of useful emissive inorganic additive markers include but are not limited to, $CaWO_4$:Eu; $CaMoO_4$:Mn,Eu; BaFBr:Eu; $Y_2O_2S$:Tb; $Y_2O_2S$:Er,Yb; $Y_2O_2S$:Er; $Y_2O_2S$:Eu; $Y_2O_3$:Eu; $Y_2O_3S$:Eu+$Fe_2O_3$; $Gd_2O_2S$:Tb; $Gd_2O_2S$:Eu; $Gd_2O_2S$:Nd; $Gd_2O_2S$:Yb,Nd; $Gd_2O_2S$:Yb,Tm; $Gd_2O_2S$:Yb, Tb; $Gd_2O_2S$:Yb,Eu; LaOF:Eu; $La_2O_2S$:Eu; $La_2O_2S$:Eu,Tb; $La_2O_2S$:Tb; $BaMgAl_{16}O_{27}$:Eu; $Y_2SiO_5$:Tb,Ce; $Y_3Al_5O_{12}$:Ce; $Y_3Al_{2.5}Ga_{2.5}O_{12}$:Ce; $YVO_4$:Nd; $YVO_4$:Eu; $Sr_5(PO_4)_3$Cl:Eu; CaS:Eu; ZnS:Ag; $ZnSiO_4$:Mn; $CaSiO_3$:Mn; ZnS:Bi; (Ca,Sr)S:Bi; $(Zn,Mg)F_2$:Mn; $CaWO_4$; $CaMoO_4$; ZnO:Zn; ZnO:Bi; and $KMgF_3$:Mn.

The composite materials of this invention can also include radiation absorbers that can absorb any particular desired radiation, including ultraviolet, violet, near-infrared, and infrared radiation, and that are designed to enhance the spectral sensitivity of the composite particles for a particular use. For example, such radiation absorbers can be present in an amount of at least 0.001 weight % based on the total composite material dry weight. Useful infrared radiation absorbers can be responsive to exposure from IR lasers. Mixtures of the same or different types of infrared radiation absorbers, described below, can be used if desired. Carbon blacks and other IR-absorbing organic or inorganic pigments (including squarylium, cyanine, merocyanine, indolizine, pyrylium, metal phthalocyanines, and metal dithiolene pigments), and iron oxide and other metal oxides can also be present, especially when the composite materials are used as toner particles for electrophotographic printing. Additional useful IR radiation absorbers include conductive carbon blacks and carbon blacks that are surface-functionalized with solubilizing or compatibilizing groups that are well known in the art. Carbon blacks that are grafted to hydrophilic, nonionic polymers, such as FX-GE-003 (manufactured by Nippon Shokubai), or which are surface-functionalized with anionic groups, such as CAB-O-JET® 200 or CAB-O-JET® 300 (manufactured by the Cabot Corporation) are also useful. Also useful are carbon blacks that are modified to have hydrophobic particle surfaces. Examples of useful carbon blacks include Mogul® L, Mogul® E, Emperor® 2000, Vulcan® XC-72, Sterling C, Black Pearls® 280, 700 and 1300, Monarch® 800 and 1400, and Regal® 330, and 400, all from Cabot Corporation (Boston Mass.). Other useful pigments include, but are not limited to, Heliogen Green, Nigrosine Base, iron (III) oxides, transparent iron oxides, magnetic pigments, manganese oxide, Prussian Blue, and Paris Blue. Other useful IR radiation absorbers are carbon nanotubes such as single- and multi-walled carbon nanotubes, graphite, graphene, and porous graphite. Graphene is an atomically thick, two-dimensional sheet composed of carbon atoms arranged in a honeycomb structure. It can be viewed as the building block of all other graphitic carbon allotropes of different dimensionality for example, graphite is made of graphene sheets stacked on top of each other. Examples of useful graphenes include, but are not limited to, xGnP graphene nanoplatelets from XG Sciences, MI, including Grade M particles that have an average thickness of approximately 6-8 nm and a typical surface area of 120 $m^2$/g to 150 $m^2$/g, and Vor-X functionalized graphene nanosheets from Vorbec Materials, MD, and graphene from Graphene Industries (UK) and Graphene Laboratories (MA). Useful radiation absorbers include all types of carbon black as described above. Various carbon blacks (conductive or non-conductive) are particularly useful as infrared radiation absorbers in the practice of this invention.

Dyes and pigments absorbing UV or visible radiation can also be present in the composite materials. Useful classes of dyes include but are not limited to, cyanine, merocyanine, methine, azamethine, triarylmethane, coumarin, rhodamine, azo and metal complex azo, stilbene, formazan and metal complex formazan, metal phthalocyanine, indigo, anthraquinone and anthrapyridone dyes. Any of the pigments described in "Industrial Organic Pigments, Third Edition" by Herbst and Hunger published by Wiley-VCH (2004) can be considered. Useful classes of pigments include but are not limited to, azo, quinophthalone, quinacridone, perylene, dioxazine, diketopyrrolo-pyrrole, anthraquinone, indigo and thioindigo, phthalocyanine, and metal phthalocyanine pigments.

Colorants or other additive markers can be present in the composite particles in an amount of at least 0.1 weight % and up to and including 30 weight %, based on the composite particle total dry weight.

Moreover, other composite materials (including composite particles) can be prepared to include one or more color fluorescent dyes or metallic flakes to provide special effects, as described for example in copending U.S. patent application Ser. No. 13/462,031 (filed May 2, 2012 by Tyagi and Granica), Ser. No. 13/462,182 (filed May 2, 2012 by Tyagi, Granica, and Kuo), Ser. No. 13/462,155 (filed May 2, 2012 by Tyagi and Granica), and Ser. No. 13/837,043 (filed Mar. 15, 2013 by Tyagi, Kuo, and Granica), the disclosures of all of which are incorporated herein by reference.

Suitable charge control agents and their use in toner particles are well known in the art as described for example in the *Handbook of Imaging Materials* $2^{nd}$ Edition, Marcel Dekker, Inc., New York, ISBN: 0-8247-8903-2, pp. 180ff and references noted therein. The term "charge control" refers to a propensity of the material to modify the triboelectric charging properties of the composite particles. A wide variety of charge control agents can be used as described in U.S. Pat. No. 3,893,935 (Jadwin et al.), U.S. Pat. No. 4,079,014 (Burness et al.), U.S. Pat. No. 4,323,634 (Jadwin et al.), U.S. Pat. No. 4,394,430 (Jadwin et al.), U.S. Pat. No. 4,624,907 (Motohashi et al.), U.S. Pat. No. 4,814,250 (Kwarta et al.), U.S. Pat. No. 4,840,864 (Bugner et al.), U.S. Pat. No. 4,834,920 (Bugner et al.), and U.S. Pat. No. 4,780,553 (Suzuka et al.), the disclosure of all of which are incorporated herein by reference. The charge control agents can be transparent or translucent and free of pigments and dyes. Mixtures of charge control agents can be used. A desired charge control agent can be chosen depending upon whether a positive or negative charging composite particle is needed.

Examples of useful charge control agents include but are not limited to, triphenylmethane compounds, ammonium salts, aluminum-azo complexes, chromium-azo complexes, chromium salicylate organo-complex salts, azo-iron complex salts, an azo-iron complex salt such as ferrate (1-), bis[4-[5-chloro-2-hydroxyphenyl)azo]-3-hydroxy-N-phenyl-2-naphthalene-carboxamidato(2-)], ammonium, sodium, or hydrogen (Organoiron available from Hodogaya Chemical Company Ltd.). Other useful charge control agents include but are not limited to, acidic organic charge control agents such as 2,4-dihydro-5-methyl-2-phenyl-3H-pyrazol-3-one (MPP) and derivatives of MPP such as 2,4-dihydro-5-methyl-2-(2,4,6-trichlorophenyl)-3H-pyrazol-3-one, 2,4-dihydro-5-methyl-2-(2,3,4,5,6-pentafluorophenyl)-3H-pyrazol-3-one, 2,4-dihydro-5-methyl-2-(2-trifluoroethylphenyl)-3H-pyrazol-3-one and the corresponding zinc salts derived therefrom. Other examples include charge control agents with one or more acidic functional groups, such as fumaric acid, malic acid, adipic acid, terephthalic acid, salicylic acid, fumaric acid monoethyl ester, copolymers derived from styrene and methacrylic acid, copolymers of styrene and lithium salt of methacrylic acid, 5,5'-methylenedisalicylic acid, 3,5-di-t-butylbenzoic acid, 3,5-di-t-butyl-4-hydroxybenzoic acid, 5-t-octylsalicylic acid, 7-t-butyl-3-hydroxy-2-napthoic acid, and combinations thereof. Still other acidic charge control agents which are considered to fall within the scope of the invention include N-acylsulfonamides, such as, N-(3,5-di-t-butyl-4-hydroxybenzoyl)-4-chlorobenzenesulfonamide and 1,2-benzisothiazol-3(2H)-one 1,1-dioxide. Another class of charge control agents include, but are not limited to, iron organo metal complexes such as organo iron complexes, for example T77 from Hodogaya. Still another useful charge control agent is a quaternary ammonium functional acrylic polymer.

Other useful charge control agents include alkyl pyridinium halides such as cetyl pyridinium halide, cetyl pyridinium tetrafluoroborates, quaternary ammonium sulfate, and sulfonate charge control agents as described in U.S. Pat. No. 4,338,390 (Lu Chin) the disclosure of which is incorporated herein by reference, stearyl phenethyl dimethyl ammonium tosylates, distearyl dimethyl ammonium methyl sulfate, and stearyl dimethyl hydrogen ammonium tosylate.

Useful waxes (can also be known as lubricants) that can be present in the composite particles include low molecular weight polyolefins (polyalkylenes) such as polyethylene, polypropylene, and polybutene, such as Polywax 500 and Polywax 1000 waxes from Peterolite, Clariant PE130 and Licowax PE190 waxes from Clariant Chemicals, and Viscol 550 and Viscol 660 waxes from Sanyo. Also useful are ester waxes that are available from Nippon Oil and Fat under the WE-series. Other useful waxes include silicone resins that can be softened by heating, fatty acid amides such as oleamide, erucamide, ricinoleamide, and stearamide, vegetable waxes such as carnauba wax, rice wax, candelilla wax, Japan wax, and jojoba wax, animal waxes such as bees wax, mineral and petroleum waxes such as montan wax, ozocerite, ceresine, paraffin wax, microcrystalline wax, and Fischer-Tropsch wax, and modified products thereof. Irrespective to the origin, waxes having a melting point in the range of at least 30° C. and up to and including 150° C. are useful. One or more waxes can be present in an amount of at least 0.1 weight % and up to and including 20 weight %, or at least 1 weight % and up to and including 10 weight %, based on the total composite particle dry weight. These waxes, especially the polyolefins, can be used also as fuser release aids.

Useful flow additive particles can be present inside or on the outer surface of the composite particles and include but are not limited to, a metal oxide such as hydrophobic fumed silica particles. Alternatively, the flow additive particles can be both incorporated into the composite particles and on their outer surface. In general, such flow additive particles have an average equivalent spherical diameter (ESD) of at least 5 nm and are present in an amount of at least 0.01 weight % and up to and including 10 weight %, based on the total composite particle dry weight.

Surface treatment agents can also be on the outer surface of the composite particles in an amount sufficient to permit the composite particles to be stripped from carrier particles in a dry two-component developer by electrostatic forces associated with the charged image or by mechanical forces. Surface fuser release aids can be present on the outer surface of the composite particles in an amount of at least 0.05 weight % to and including 1 weight %, based on the total composite particles dry weight. These materials can be applied to the outer surfaces of the composite particles using known methods for example by powder mixing techniques.

Spacing treatment agent particles ("spacer particles") can be attached to the outer surface of the composite particles by electrostatic forces or physical means, or both. Useful surface treatment agents include but are not limited to, silica such as those commercially available from Degussa as R972 and RY200 or from Wasker as H2000. Other suitable surface treatment agents include but are not limited to, titania, aluminum, zirconia, or other metal oxide particles, and polymeric beads all generally having an ECD of less than 1 μm. Mixture of these materials can be used if desired, for example a mixture of hydrophobic silica and hydrophobic titania particles.

Making Multi-Compartment Porous Chemically Cross-linked Elastomeric Particles

A method for making the multi-compartment porous chemically-crosslinked elastomeric particles includes the formation of one or more (for example, first and second) water-in-oil emulsions. A first stable water-in-oil emulsion is formed, including a first aqueous phase that is dispersed in a first oil phase. This first oil phase comprises a first polyfunctional reactive compound, a first reagent that causes crosslinking, optionally at least one first ethylenically unsaturated polymerizable monomer, and optionally a first organic solvent. The first aqueous phase creates the first discrete pores in the resulting chemically-crosslinked organic porous particles. The first aqueous phase can also include a first pore stabilizing hydrocolloid and a first additive marker if desired.

Useful polyfunctional reactive compounds, reagents that cause crosslinking, ethylenically unsaturated polymerizable monomers, and organic solvents are described below. They are used to form a chemically-crosslinked organic solid phase (polymer phase) in the multi-compartment, chemically-crosslinked elastomeric particles.

The method can optionally provide a second water-in-oil emulsion comprising a second aqueous phase comprising a second pore stabilizing hydrocolloid (and optionally, a second additive marker) dispersed in a suitable second oil phase. This second oil phase comprises a second polyfunctional reactive compound, a second reagent that causes crosslinking, optionally at least one second ethylenically unsaturated polymerizable monomer, and optionally a second organic solvent. This second aqueous phase creates the second discrete pores in the resulting chemically-crosslinked organic porous particles. The second additive marker can be detectably different from the first additive marker if desired.

The first and second pore stabilizing hydrocolloids (described below) can be the same or different chemicals, or the same or different mixtures of chemicals. In most embodiments, they are the same chemicals. In addition, the first and second oil phases can comprise the same or different organic solvents (described below), or the same or different mixtures of organic solvents. In most embodiments, the first and second oil phases contain the same organic solvents. Further, the first and second polyfunctional reactive compounds or first and second ethylenically unsaturated monomers and first and second reagents that cause crosslinking used in preparing the first and second oil phases can be the same or different compounds, or mixtures of compounds, but in most embodiments, they are the same compounds in both oil phases.

Suitable pore stabilizing hydrocolloids for preparing all of the emulsions described herein include both naturally occurring and synthetic, water-soluble or water-swellable polymers selected from the group consisting of cellulose derivatives [such for example, carboxymethyl cellulose (CMC) that is also referred to as sodium carboxymethyl cellulose], gelatin (for example, alkali-treated gelatin such as cattle bone or hide gelatin, or acid treated gelatin such as pigskin gelatin), gelatin derivatives (for example, acetylated gelatin and phthalated gelatin), proteins and protein derivatives, hydrophilic synthetic polymers [such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, poly(vinyl pyridine), and methacrylamide copolymers], water soluble microgels, polyelectrolytes [such as a polystyrene sulfonate, poly(2-acrylamido-2-methylpropanesulfonate), and a polyphosphate], and mixtures of any of these classes of materials.

Other synthetic polyelectrolyte hydrocolloids such as polystyrene sulfonate (PSS), poly(2-acrylamido-2-methyl-propanesulfonate) (PAMS), and polyphosphates are also useful pore stabilizing hydrocolloids.

For example, the first and second pore stabilizing hydrocolloids are the same or different and independently selected from the group consisting of carboxymethyl cellulose (CMC), a gelatin, a protein or protein derivative, a hydrophilic synthetic polymer, a water-soluble microgel, a polystyrene sulfonate, poly(2-acrylamido-2-methylpropanesulfonate), and a polyphosphate.

The pore stabilizing hydrocolloids are soluble in water, have no negative impact on multiple emulsification processes, and have no negative impact on melt rheology of the resulting chemically-crosslinked organic porous particles. The amount of the first and second pore stabilizing hydrocolloids used to prepare the first and second emulsions (and any additional emulsions) will depend on the amount of porosity and size of pores desired and the molecular weight and charge of the pore stabilizing hydrocolloid that is chosen. For example, the first and second pore stabilizing hydrocolloids can be different in the first and second aqueous phases, resulting in chemically-crosslinked organic porous particles having first discrete pores that are different in size from the second discrete pores. CMC is particularly useful as a pore stabilizing hydrocolloid in both first and second water-in-oil emulsions in an amount of at least 0.5 weight % and up to and including 20 weight %, or at least 1 weight % and up to and including 10 weight %, based on the total weight of first and second aqueous phases used in each emulsion.

The first and second aqueous phases used in forming the first and second water-in-oil emulsions can additionally contain, if desired, salts to buffer the emulsions and optionally to control the osmotic pressure of the aqueous phases relative to the osmotic pressure of the external (third) water phase. When CMC is used, for example, the osmotic pressure can be increased by buffering using a pH 7 buffer. The first and second emulsions can also contain additional pore forming agents such as ammonium carbonate.

The first and second polyfunctional reactive compounds used in the first and second oil phases (or additional oil phases) are crosslinkable through chain growth or step growth polymerization reactions. The mechanistic pathways in each of these reactions are different. Chain-growth polymerization proceeds as a result of free-radicals or ions, whereas in step-growth polymerization, functional groups react with each other to increase the chain length or crosslink chains. This distinction was introduced by Paul Flory in 1953, as described in "Principles of Polymer Chemistry", Cornell University Press, 1953, p. 39.

Polyfunctional reactive compounds suitable for chain growth polymerization include polyfunctional polymerizable monomers and oligomers such as acrylate and methacrylate oligomers [the term "(meth)acrylate" used herein refers to acrylate and methacrylate] of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth)acrylate and mixtures thereof, and acrylate and methacrylate oligomers derived from low-molecular weight polyester resins, polyether resins, epoxy resins, polyurethane resins, alkyd resins, spiroacetal resins, epoxy acrylates, polybutadiene resins, and polythiol-polyene resins, and mixtures thereof that are capable of being dissolved in a suitable solvent or diluent monomers (described below) that are immiscible with the aqueous water phases and are substantially insoluble in water.

Additional polyfunctional reactive compounds suitable for chain growth polymerization also include polyfunctional monomers such as divinyl benzene, ethylene glycol dimethacrylate, trimethylolpropane triacrylate, hexanediol dimethacrylate, tripropylene glycol dimethacrylate, diethylene glycol dimethacrylate, pentaerythritol triacrylate, dipentaerythritol hexamethacrylate, and neopentyl glycol di(meth)acrylate, and mixtures thereof.

Useful polyfunctional reactive compounds suitable for chain growth polymerization include urethane acrylate and methacrylate oligomers that are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides unsaturation at the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, the polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for chain growth polymerization. Choices among isocyanates, polyols, and acrylate or methacrylate termination units allow considerable latitude in the development of urethane acrylate oligomers. Urethane acrylates like most oligomers are typically high in molecular weight and viscosity. These multifunctional reactive compounds contain multiple reactive sites. Their functionality can vary from 2 to 6. Particularly useful polyfunctional reactive compounds for chain growth polymerization include polyfunctional esters such as polybutadiene dimethacrylate and 1,6-hexanediol diacrylate, and polyhydric alcohols and their derivatives such as mixtures of acrylate derivatives of pentaerythritol, including pentaerythritol tetraacrylate and pentaerythritol triacrylate functionalized aliphatic urethanes derived from isophorone diisocyanate. Examples of useful polyfunctional reactive urethane acrylate compounds, and mixed esters of polybutadiene dimethacrylate and 1,6-hexanediol diacrylate compounds are commercially available oligomers from Sartomer Company (Exton, Pa.), such as CN 968 and CN301.

Polyfunctional reactive compounds suitable for step growth polymerizations include polymers such as those derived from vinyl monomers and condensation monomers such as esters and mixtures thereof. Such polymers include those that have an acid or hydroxyl number greater than 2, examples include but are not limited to polymers such as polyesters, polyurethanes, urethane acrylic copolymers, epoxy resins, silicone resins, polyamide resins, modified rosins, paraffins, and waxes. Still other useful polymers are polyesters of aromatic or aliphatic dicarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. Such polymers can also be derived from vinyl monomers such as styrenic polymers, mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic mono-carboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone), all of the above copolymerized with monomers such as (meth)acrylic acid, maleic acid, hydroxyethyl (meth)acrylate and the like to result in polyfunctional reactive compounds such that they are capable of being crosslinked with a reagent that causes crosslinking, being dissolved in a suitable solvent or ethylenically unsaturated monomers (described below) that are immiscible with the aqueous water phases and are substantially insoluble in water.

Ethylenically unsaturated polymerizable monomers useful in this invention include mono-functional monomers, such as acrylate and methacrylate monomers, and vinyl monomers, for example, methyl methacrylate, butyl (meth)acrylate, 2-ethylhexyl (meth)acrylate, styrene, vinyl pyrrolidone, and mixtures thereof. It is not outside the scope of this invention to use mono-ethylenically unsaturated oligomers in place of or in addition to the ethylenically unsaturated monomers described above.

Polyfunctional reactive compounds, crosslinkable through chain growth polymerization or step growth polymerization can be used in any or all of the oil phases are described above.

When an oil phase contains one or more of the polyfunctional reactive compounds that are crosslinkable through chain growth polymerization reactions including ethylenically unsaturated polymerizable monomers described above, that oil phase also includes a suitable reagent that causes crosslinking that is typically a free radical initiator that provides free radicals useful for initiating and continuing free radical chain growth polymerization. Useful free radical initiators for chain growth polymerization reactions well known in the art and include such classes of compounds as azo compounds, peroxides, and other oil-soluble free radical initiators that are readily available from a number of commercial sources. A skilled worker would understand how much of a specific initiator would be best for specific monomers. Typically, an initiator is present in an amount of at least 1 weight % and up to and including 5 weight % based on the total weight of the polyfunctional reactive compound and the ethylenically unsaturated monomers that can be polymerized by chain growth polymerization. The free radical initiator can be activated by heat or light such as UV radiation. The temperature or wave length of light used depends on the half life of the initiator at the desired temperature or the absorption characteristics of the photoinitiator respectively.

When an oil phase contains one or more of the polyfunctional reactive compounds crosslinkable through step growth polymerization reactions monomers described above, that oil phase also includes a suitable reagent that causes crosslinking that is typically a reactive compound that provides appropriate functional groups for step growth polymerization. Useful step growth polymerization reactions are polyfunctional aziridines or polyfunctional glycidyl compounds. Examples of useful reagents that cause crosslinking through step growth polymerization include but are not limited to, CX-100, a polyfunctional aziridine from DSM Neo Resins, and ERISYS GE240, a tetra glycidyl m-xylene diamine from CVC Thermoset Specialties, butanediol diglycidyl ether, 2,3-dihydroxydioxane, chromium potassium sulfate, and zinc ammonium carbonate.

Any suitable organic solvent that will dissolve the polyfunctional reactive compound and the ethylenically unsaturated polymerizable monomers and that is also immiscible with water can be used to prepare the first and second emulsions (or additional emulsions). Such organic solvents include but are not limited to, methyl acetate, ethyl acetate, propyl acetate, chloromethane, dichloromethane, vinyl chloride, trichloromethane, carbon tetrachloride, ethylene chloride, trichloroethane, toluene, xylene, cyclohexanone, 2-nitropropane, dimethyl carbonate, and mixtures of two or more of these solvents. Ethyl acetate and propyl acetate are generally good solvents for many useful polymers while being sparingly soluble in water, and they are readily removed as described below by evaporation. In the case where the polyfunctional reactive compound is crosslinked using chain growth polymerization, the organic solvent if used, is removed prior to completion of the crosslinking reaction. It can be removed after the water-in-oil-in-water emulsion is formed and before the free radical initiator is activated by light or heat, or it can be removed after the chain growth polymerization is allowed to proceed partially or fully. The function of the solvent in all cases is not only to dissolve the multifunctional reactive compounds but also to provide a template for increasing porosity by accommodating increased weight fraction of the aqueous phases in the first and second emulsions. Optionally, organic solvents that will dissolve the polymers and that are immiscible with water can be a mixture of two or more water-immiscible solvents chosen from the list given above.

The first and second oil can also contain emulsifiers to stabilize the first and second water-in-oil emulsions. Such emulsifiers usually have a low HLB number. Useful emulsifiers for the water-in-oil emulsions include but are not limited to, sorbitan esters of fatty acids such as oleic acid and stearic acid, polyethylene oxide esters of fatty acids, Tetronic® 150R1 a tetrafunctional block copolymer with terminal secondary hydroxyl groups (available from BASF Corporation), and polyglycerol polyricinoleate, GRINDSTED® PGPR 90 (available from DANISCO®).

The first and second emulsions (and any additional emulsions) used to prepare the chemically-crosslinked organic porous particles can be prepared by any known emulsifying technique and conditions using any type of mixing and shearing equipment. Such equipment includes but is not limited to, a batch mixer, planetary mixer, dynamic or static mixer, colloid mill, high pressure homogenizer, sonicator, or a combination thereof. While any high shear type agitation device is useful, a particularly useful homogenizing device is the Microfluidizer® such as Model No. 110T produced by Microfluidics Manufacturing operating at >5000 psi (>351.5 kg/cm$^2$). In this device, the droplets of the first and second aqueous phases can be dispersed separately and reduced in size in the respective oil (organic) phases in a high flow agitation zone and, upon exiting this zone the particle size of the dispersed aqueous phases is reduced to uniform sized dispersed droplets in each of the oil phases. The temperature of the process can be modified to achieve the optimum viscosity for emulsification of the droplets and to minimize evaporation of the oil phases.

Optionally, the first and second water-in-oil emulsions can be combined to form a third water-in-oil emulsion containing a mixture of the first and second oil phases and distinct droplets of the first and second aqueous phases. The first and second water-in-oil emulsions can be combined in any desirable weight ratio. For example, in some embodiments, the weight ratio of the first water-in-oil emulsion to the second oil-in-water emulsion can be at least 1000:1 and to and including 0.01:1.

In some embodiments, a third oil phase (containing any of the organic solvents from the list of organic solvents described above) containing a third polyfunctional reactive compound (chosen from the list of polyfunctional reactive compounds described above) or ethylenically unsaturated polymerizable monomers and a reagent that causes crosslinking initiators (as described above) can be combined with the first and second water-in-oil emulsions. The third polyfunctional reactive compound can be the same or different from the first and second polyfunctional reactive compounds described above. The third oil phase containing the third polyfunctional reactive compound can be combined in this manner in any suitable amount in relation to the first and second water-in-oil emulsions, for example, but not limited to, a weight ratio of at least 100:1 and to and including 1:100. The addition of the third oil phase allows the manufacturer to use stock solutions of the first and second water-in-oil emulsions and to modify them as desired without having to make up fresh water-in-oil emulsions.

Either the first water-in-oil or the third water-in-oil emulsion is then dispersed in a third aqueous phase that can contain a surface stabilizing agent to form a water-in-oil-in-water emulsion containing droplets of either the first water-in-oil emulsion or the third water-in-oil emulsion, respectively. These third water-in-oil emulsion droplets contain the distinct droplets of the first and second aqueous phases. The third water-in-oil emulsion can be dispersed within a third aqueous phase in the presence of a colloidal silica stabilizing agent to form a water-in-oil-in-water emulsion, containing an aqueous suspension of oil droplets of the third water-in-oil emulsion, wherein the oil droplets contain discrete smaller droplets of the first aqueous phase, and second aqueous phase if present.

The water-in-oil-in-water emulsion is subjected to shear or extensional mixing or similar flow processes, for example through a capillary orifice device to reduce the droplet size and achieve narrow size distribution droplets through the limited coalescence process. The pH of the third aqueous phase is generally between 4 and 7 when colloidal silica is used as the stabilizing agent.

It can also be useful to add a shape control agent (described below) to one or more of the aqueous phases.

The suspension of droplets of the first water-in-oil (and second water-in-oil emulsion if present) in the third aqueous phase, results in droplets of the noted reactants dissolved in the oil containing the first aqueous phase (and second aqueous phase, if present) as distinct finer droplets within the bigger polymer droplets that upon drying produce discrete porous domains in the resulting multi-compartment, chemically-crosslinked elastomeric particles containing the polymer(s) as a chemically crosslinked organic solid phase.

Useful surface stabilizing agents include both water soluble polymers and small colloidal particles but are not limited to, stabilizer polymers such as poly(vinyl pyrrolidone) and poly(vinyl alcohol), inorganic stabilizers such as clay particles, colloidal silica (for example LUDOX™ or NALCO™), or polymer latex particles as described in modified ELC process described in U.S. Pat. No. 4,833,060 (Nair et al.), U.S. Pat. No. 4,965,131 (Nair et al.), U.S. Pat. No. 2,934,530 (Ballast et al.), U.S. Pat. No. 3,615,972 (Morehouse et al.), U.S. Pat. No. 2,932,629 (Wiley), and U.S. Pat. No. 4,314,932 (Wakimoto et al.). Any combinations of these surface stabilizing agents can also be used.

The actual amount of surface stabilizing agent used in the method depends on the size of the final multi-compartment, chemically-crosslinked elastomeric particles desired, which in turn depends upon the volume and weight ratios of the various phases used for making the multiple emulsions. While not intending to be limiting, the amount of surface stabilizing agent can be at least 0.1 weight % and up to and including 10 weight %, or typically at least 0.2 weight % and up to and including 5 weight %, based on the total weight of the water-in-oil-in-water emulsion and depending upon the particle size of the surface stabilizing agent (for example, colloidal or fumed silica particles).

Where the water-in-oil-in-water emulsion is formed, shear or extensional mixing or flow process is controlled in order to minimize disruption of the distinct droplets of the first aqueous phase (and second aqueous phase, if present) in the oil phase(s). Droplet size reduction is achieved by homogenizing the final water-in-oil-in-water emulsion through a capillary orifice device, or other suitable flow geometry. The shear field used to create the droplets in the final water-in-oil-in-water emulsion can be created using standard shear geometries, such as an orifice plate or capillary. However, the flow field can also be generated using alternative geometries, such as packed beds of beads, or stacks or screens that impart an additional extensional component to the flow. It is well known in the literature that membrane-based emulsifiers can be used to generate multiple emulsions. These techniques allow the droplet size to be tailored across a wider range of sizes by adjusting the void volume or mesh size, and can be applied across a wide range of flow rates. The back pressure suitable for producing acceptable particle size and size distribution is at least 100 and up to and including 5000 psi (7 kg/cm$^2$ to 351.5 kg/cm$^2$), or typically at least 500 and up to and including 3000 psi (35.1 kg/cm$^2$ to 211 kg/cm$^2$). The flow rate is generally at least 1000 and up to and including 6000 ml per minute, particularly when a capillary orifice device is used.

The final size of the multi-compartment, chemically-crosslinked elastomeric particles and the final size of the internal compartments can be impacted by the osmotic mismatch between the osmotic pressure of the one or both of the first and second aqueous phases and the third aqueous phase. At each interface, the larger the osmotic pressure gradient present, the faster the diffusion rate where water will diffuse from the lower osmotic pressure phase to the higher osmotic pressure phase depending on the solubility and diffusion coefficient in the oil (organic) phase. If the osmotic pressure of the third aqueous phase is higher than the either or both of the first and second aqueous phases, then the water will migrate out of the compartments and reduce the porosity and pore size. In order to maximize porosity, one can tailor the osmotic pressures so that the osmotic pressure of the third aqueous phase is lower, than the osmotic pressure of the first phase or both first and second aqueous phases. Thus, water will diffuse following the osmotic gradient from the third aqueous phase into the first aqueous phase (and second aqueous phase, if present) swelling the size of the distinct droplets of the first and second aqueous phases thereby increasing the final porosity and pore size. This osmotic shock is desirably created after the homogenization of the water-in-oil-in-water emulsion to minimize disruption of the distinct droplets of the aqueous phases.

If it is desirable to have small compartments and maintain the initial small drop size formed in the making of the first and second emulsions, the osmotic pressure of both the interior and exterior aqueous phase can be matched, or have only a small osmotic pressure gradient. Depending on the osmotic pressure of each of the first and second aqueous phases and their values relative to the third aqueous phase, the resulting discrete compartments can have different average sizes.

Optionally, additional water can be added to the water-in-oil-in-water emulsion to increase the size of the compartments by creating an osmotic pressure mismatch between the first and second aqueous phases as described above.

Once the water-in-oil-in-water emulsion has been formed, the polyfunctional reactive compounds and optionally ethylenically unsaturated polymerizable monomer(s) supplied from one or both of the first and second water-in-oil emulsions, are polymerized to form precursor multi-compartment, chemically-crosslinked elastomeric particles having a chemically-crosslinked solid phase including an external particle surface, and discrete compartments, and optionally first and second discrete compartments that are isolated from each other and dispersed within the solid organic phase. This crosslinking can be instigated by the application of heat or radiation (for example actinic, IR, or UV radiation) as described earlier for initiating crosslinking by chain growth polymerization so that the polymerization initiator provides free radicals for monomer polymerization, crosslinking, and solidification. In the case of step growth polymerization, generally crosslinking is instigated with heat usually during solvent removal for solidification.

The first and second organic solvents, if present, can then be removed to produce an aqueous suspension of precursor multi-compartment, chemically-crosslinked elastomeric particles containing discrete compartments such as first and second compartments that optionally include the same or different additive markers. The precursor multi-compartment, chemically-crosslinked elastomeric particles can then be subjected to suitable isolation and drying techniques to provide the desired multi-compartment, chemically-crosslinked elastomeric particles. The details of this process depend upon the water solubility and boiling points of the organic solvents in the oil phases relative to the temperature of the drying process. Generally, however, organic solvents can be removed by evaporation using removal apparatus such as a rotary evaporator or a flash evaporator. The multi-compartment, chemically-crosslinked elastomeric particles can be isolated after removing the organic solvents by filtration or centrifugation, followed by drying for example in an oven at 40° C. that also removes any water remaining in the compartments. Optionally, the multi-compartment, chemically-crosslinked elastomeric particles can be treated with alkali to remove any silica surface stabilizer particles.

The shape of the multi-compartment porous crosslinked elastomeric particles can be modified to be spherical or non-spherical. In the method used to prepare them, additives (shape control agents) can be incorporated into the first or second aqueous phases, in the first or second oil (organic) phase or in the third aqueous phase to modify their shape, aspect ratio or morphology. The shape control agents can be added after or prior to forming the water-in-oil-in-water emulsion. In either case, the interfacial tension at the oil and third water interface is modified before solvent is removed, resulting in a reduction in sphericity. The more desirable shape control agents are polyethyloxazoline, fatty acid modified polyesters such as EFKA® 6225 and EFKA® 6220 from Ciba BASF, and phosphate esters of alkoxylated phenols such as SynFac® 8337.

Multi-compartment porous chemically-crosslinked elastomeric particles that are not perfectly spherical can have an aspect ratio of less than 0.95 and typically less than 0.9 and as low as 0.1.

It should be understood from the foregoing description, that the method can be modified or expanded to incorporate additional discrete compartments. To accomplish this, for example, the method described herein can further comprise:

combining one or more additional water-in-oil emulsions, each comprising a pore stabilizing hydrocolloid in one or more additional aqueous phases that are dispersed in one or more additional oil phases each, and each oil phase containing a polyfunctional reactive compound, a reagent that causes crosslinking, optionally an ethylenically unsaturated polymerizable monomer, and optionally an organic solvent, with the first and second water-in-oil emulsions described above so that the third water-in-oil emulsion contains distinct droplets of the first, second, and the one or more additional aqueous phases.

Further details of these manufacturing processes are provided for example in U.S. Patent Application Publication 2011/0262858 (Nair et al.).

Method of Making Composite Materials and Composite Particles

A preferred method for making the composite materials of the present invention can be carried out using the following general conditions but specific preparation conditions are described in the working examples below for the composite particles.

The composite materials including composite particles are generally prepared by bringing together the organic polymer(s) used to provide the solid non-elastomeric continuous phase and the plurality of multi-compartment porous chemically crosslinked elastomeric particles described above.

The dry composite particles can be melt processed in a suitable apparatus such as a two-roll mill or hot-melt extruder. In some embodiments, the dry melt is extruded under low shear conditions in an extrusion device to form an extruded composition. However, these low shear conditions are not always required in the practice of this invention. The melt processing time can be at least 1 minute and up to and including 60 minutes, and the time can be adjusted by a skilled worker to provide the desired melt processing temperature and uniformity in the resulting extruded composition.

Generally, the dry blend of composite particles can be melt extruded in the extrusion device at a temperature higher than the glass transition temperature of the organic polymers within the composite particles, and generally at a temperature of at least 90° C. and up to and including 240° C. or typically of at least 120° C. and up to and including 160° C. The temperature results, in part, from the frictional forces of the melt extrusion process.

The resulting extruded composition (sometimes known as a "melt product" or a "melt slab") is generally cooled, for example, to room temperature, and then broken up (for example pulverized) into dry toner particles having a desired mode particle size as described above. It is generally best to first grind the extruded composition prior to a specific pulverizing operation. Grinding can be carried out using any suitable procedure. For example, the extruded composition can be crushed and then ground using for example a fluid energy or jet mill as described for example in U.S. Pat. No. 4,089,472 (Seigel et al.). The particles are then further reduced in size by using high shear pulverizing devices such as a fluid energy mill, and then classified as desired.

There are several alternative method for making the composite particles of this invention that can be envisioned to one skilled in the art such as for the example the evaporative limited coalescence, limited coalescence or emulsion aggregate methods as described in U.S. Pat. No. 4,833,060 (Nair et al.), U.S. Pat. No. 4,965,131 (Nair et al.), U.S. Pat. No. 2,934,530 (Ballast et al.), U.S. Pat. No. 3,615,972 (Morehouse et al.), U.S. Pat. No. 2,932,629 (Wiley), and U.S. Pat. No. 4,314,932 (Wakimoto et al.).

The resulting composite particles of this invention, when used as toner particles for electrophotography can then be surface treated with suitable hydrophobic flow additive particles, as described above, having an equivalent circular diameter (ECD) of at least 5 nm to affix such hydrophobic flow additive particles on the outer surface of the toner particles.

In particular, a hydrophobic fumed silica such as R972 or RY200 (from Nippon Aerosil) can be used for this purpose, and the amount of the fumed silica particles can be as noted above, or more typically at least 0.1 weight % and up to and including 3 weight %, based on the total toner particle dry weight.

The hydrophobic flow additive particles can be added to the outer surface of the dry toner particles by mixing both types of particles in an appropriate mixer.

The composite particles of this invention when used as toners can be classified (sieved) through a 230 mesh vibratory sieve to remove non-attached silica particles and silica agglomerates and any other components that may not have been incorporated into the toner particles. The temperature during the surface treatment can be controlled to provide the desired attachment.

Developers

The composite particles of this invention, when used as toner particles, can be used as a dry mono-component developer, or combined with carrier particles to form dry two-component developers. In all of these embodiments, a plurality (usually thousands or millions) of individual composite particles are used together as toner particles (sometimes known in the art as "toner" or "electrophotographic toner").

Such dry mono-component or dry two-component developers generally comprise a charge control agent, wax, lubricant, fuser release aid, or any combination of these materials within the dry toner particles, or they can also include flow additive particles on the outer surface of the particles. Such components are described above.

Useful dry one-component developers generally include the composite particles as the sole essential component. Dry two-component developers generally comprise carrier particles (also known as carrier vehicles) that are known in the electrophotographic art and can be selected from a variety of materials, along with the composite particles. Carrier particles can be uncoated carrier core particles (such as magnetic particles) and core magnetic particles that are overcoated with a thin layer of a film-forming polymer such as a silicone resin type polymer, poly(vinylidene fluoride), poly(methyl methacrylate), or mixtures of poly(vinylidene fluoride) and poly(methyl methacrylate).

The amount of composite particles in a two-component developer can be at least 4 weight % and up to and including 20 weight % based on the total dry weight of the two-component dry developer.

Method of Using Composite Particles in Electrophotography

The particularly useful composite particles of the present invention can be used a toner particles in electrostatic or electrophotographic methods to provide toner images on suitable receiver materials. In particular, the composite particles can be used to provide multi-dimensional toner images on receiver materials.

One common method for printing such toner images on a receiver material is referred to as electrophotography. The production of black-and-white or color images using electrophotography generally includes producing a latent electrostatic image by uniformly charging a dielectric member such as a photoconductive substance, and then discharging selected areas of the uniform charge to yield an imagewise electrostatic charge pattern. Such discharge is generally accomplished by exposing the uniformly charged dielectric member to actinic radiation provided by selectively activating particular light sources in an LED array or a laser device directed at the dielectric member. After the imagewise charge pattern is formed, it is "developed" into a visible toner image using colored or non-colored toner particles by either using the charge area development (CAD) or the discharge area development (DAD) method that have an opposite charge to the dielectric member and are brought into the vicinity of the dielectric member so as to be attracted to the imagewise charge pattern.

Thereafter, a suitable receiver material (for example, a cut sheet of plain bond paper) is brought into juxtaposition with the toner image developed with the toner particles in accordance with the imagewise charge pattern on the dielectric member, either directly or using an intermediate transfer member. A suitable electric field is applied to transfer the toner particles to the receiver material in the imagewise pattern to form the desired print image on the receiver material. The receiver material is then removed from its operative association with the dielectric member and subjected to suitable heat or pressure or both heat and pressure to permanently fix (also known as fusing) the toner image (containing toner particles) to form the desired image on the receiver material.

As noted above, plural toner particle images of, for example, different color toner particles respectively can be overlaid with multiple toner transfers to the receiver material, followed by fixing of all toner particles to form a multi-color image in the receiver material. Toner particles that are used in this fashion to prepare multi-color images are generally Cyan (C), Magenta (M), Yellow (Y), and Black (K) toners containing appropriate colorants to provide the desired colors or tones.

In general, the dry toner particles derived from the composite particles of this invention described herein can be applied to a suitable receiver material (or substrate) of any type using various methods such as a digital printing process such as an electrostatic printing process, or electrophotographic printing process as described in L. B. Schein, *Electrophotography and Development Physics,* 2nd Edition, Laplacian Press, Morgan Hill, Calif., 1996 (ISBN 1-885540-02-7), or by an electrostatic coating process as described for example in U.S. Pat. No. 6,342,273 (Handels et al.).

Such receiver materials include, but are not limited to, coated or uncoated papers (cellulosic or polymeric papers), transparent polymeric films, ceramics, paperboard, cardboard, metals, fibrous webs or ribbons, and other substrate materials that would be readily apparent to one skilled in the art. In particular, the receiver materials (also known as the final receiver material or final receiver material) can be sheets of paper or polymeric films that are fed from a supply of receiver materials.

For example, the composite particles of this invention, when used as dry toner particles can be applied to a receiver material by a digital printing process such as an electrostatic printing process that includes but is not limited to, an electrophotographic printing process, or by a coating process such as an electrostatic coating process including an electrostatic brush coating as described in U.S. Pat. No. 6,342,273 (Handels et al.).

In one electrophotographic method, one or more latent images (that is an electrostatic latent image) can be formed on a primary imaging member such as a charged photoconductor belt or roller using a suitable light source such as a laser or light emitting diode. The one or more latent images are then developed on the primary imaging member by bringing the latent images into close proximity with a dry one-component or dry two-component developer comprising the composite particles (toner particles) of this invention to form a toner image on the primary imaging member.

In the embodiments of multi-color printing, multiple photoconductors can be used, each developing a separate non-fluorescing or fluorescing color dry toner image using the dry toner particles of this invention for at least one of the toner images. Alternatively, a single photoconductor can be used with multiple developing stations where after each latent toner image and is developed, it is transferred to the receiver material, or it is transferred to an intermediate transfer member (belt or rubber) and then to the receiver material after all of the toner images have been accumulated on the intermediate transfer member.

In some embodiments, it is desirable to develop and fix the latent image with sufficient dry toner particles to form an enhanced composite toner image wherein the covering power of each developed toner image is at least 400 cm$^2$/g to and including 2300 cm$^2$/g.

While a developed dry toner image can be transferred to a final receiver (receiver material) using a thermal or thermal assist process as is known in the art, it is generally transferred using an electrostatic process including an electrophotographic process such as that described in L. B. Schein, *Electrophotography and Development Physics,* 2$^{nd}$ Edition, Laplacian Press, Morgan Hill, Calif., 1996. The electrostatic transfer can be accomplished using a corona charger or an electrically biased transfer roller to press the receiver material into contact with the primary imaging member while applying an electrostatic field. In an alternative embodiment, a developed toner image can be first transferred from the primary imaging member to an intermediate transfer member (belt or roller) that serves as a receiver material, but not as the final receiver material, and then transferred from the intermediate transfer member to the final receiver material.

Electrophotographic color printing generally includes subtractive color mixing wherein different printing stations in a given apparatus are equipped with cyan, yellow, magenta, and black toner particles. Thus, a plurality of toner images of different colors can be applied to the same primary imaging member (such as dielectric member), intermediate transfer member, and final receiver material, including one or more color toner images. Such different toner images are generally applied or transferred to the final receiver material in a desired sequence or succession using successive toner application or printing stations in an electrophotographic printing apparatus.

As described in U.S. Ser. No. 13/462,031 (filed May 2, 2012 by Tyagi and Granica) and Ser. No. 13/462,182 (filed May 2, 2012 by Tyagi, Granica, and Kuo), and Ser. No. 13/873,359 (filed Apr. 30, 2013 by Tyagi, Granica, and Lofftus) and Ser. No. 13/836,491 (filed Mar. 15, 2013 by Tyagi and Granica), the present invention can also be used to provide toner images using toner particles containing metallic flakes or fluorescent dyes.

The various transferred toner images are then fixed (thermally fused) on the receiver material in order to permanently affix them to the receiver material. This fixing can be done using various means such as heating alone (non-contact fixing) using an oven, hot air, radiant, or microwave fusing, or by passing the toner image(s) through a pair of heated rollers (contact fixing) to thereby apply both heat and pressure to the toner image(s) containing toner particles. Generally, one of the rollers is heated to a higher temperature and can have an optional release fluid to its surface. This roller can be referred to as the fuser roller, and the other roller is generally heated to a lower temperature and usually serves the function of applying pressure to the nip formed between the rollers as the toner image(s) is passed through. This second roller can be referred to as a pressure roller. Whatever fixing means is used, the fixing temperature is generally higher than the glass transition temperature of the various dry toner particles, which $T_g$ can be at least 45° C. and up to and including 90° C. or at least 50° C. and up to and including 70° C. Thus, fixing is generally at a temperature of at least 95° C. and up to and including 220° C. or more generally at a temperature of at least 135° C. and up to and including 210° C.

As the developed toner image(s) on the receiver material is passed through the nip formed between the two rollers, the various dry toner particles in the developed toner image(s) are softened as their temperature is increased upon contact with the fuser roller. The melted toner particles generally remain affixed on the surface of the receiver material.

For example, the method of this invention for forming an electrophotographic toner image, comprises:

applying a layer of composite particles of the present invention to a substrate in an imagewise fashion to form a non-fused toner image on the substrate, applying the same composite particles one or more times on the non-fused toner image to form a multi-dimensional toner image of the composite particles, and fusing the multi-dimensional toner image of composite particles to form a fused multi-dimensional toner image on the substrate.

In addition, the method for forming a toner image of this invention, comprises:

applying a layer of composite particles of the present invention to an electrostatic image on a primary toner receiver to form a non-fused toner image on the primary toner receiver, transferring the composite particles in the non-fused toner image from the primary toner receiver to a final receiver material, fusing the composite particles on the final receiver material, repeating the foregoing applying, transferring, and fusing features using the same composite particles one or more times to form a fused multi-dimensional toner image on the final receiver material.

This method can be used to provide multi-dimensional toner images by this repeated applying of composite (toner) particles of this invention as described in FIG. 6 of U.S. Pat. No. 7,965,961 (noted above), that is incorporated herein by reference for the discussion of multi-dimensional toner images. Alternatively, as shown in FIG. 7 of U.S. Pat. No. 7,965,961, several layers of the toner particles $t_1$ can be selectively covered in a desired raised multi-dimensional toner shape with respect to the desired location with layers of toner particles $t_2$ of a larger mode particle size.

The height of the various layers is a factor in the formation of the raised multi-dimensional toner particle shape. After each layer is laid down, the height of each toner particle shape can be read and the remaining heights recalculated based on the lens shape determinants information on the toner to be used to determine if a height correction should be made to the remaining layers as they are laid down or if alternative toner layers should be applied in conjunction with alternative finishing methods, such as a toner fusing at a reduced temperature. Alternatively, the height checks can occur after each pass in a multi-pass system to help achieve the desired raised multi-dimensional toner shape. There determinations are most easily made in relation to the registration pattern but can be made randomly, if desired.

The method of the present invention can be used in a printing apparatus with multiple printing stations, for example where the different color toner particles are to be applied to form a composite toner image using different color toners in different printing stations, or where the same toner particles are to be applied multiple times from multiple printing stations to provide the multi-dimensional toner images as described above.

A desired profile for a multi-dimensional toner image can be printed using an electrophotographic process using suitable toner particles of desired mode particle size, size distribution, and other properties such as packing and porosity. The size and shape of the multi-dimensional toner image can be varied from the digital image source by controlling the "stack" height of the toner particles on the receiver material, and this can be done by using toner particles to provide the desired packing and porosity. The various printer stations in the electrophotographic apparatus can be used to deposit different sized toner particles in a desired order according to predetermined digital inputs from appropriate computer programs or algorithms. Further details for this process are described for example in Cols. 7-9 of U.S. Pat. No. 7,965,961 (noted above).

The present invention provides at least the following embodiments and combinations thereof, but other combinations of features are considered to be within the present invention as a skilled artisan would appreciate from the teaching of this disclosure:

1. A composite material comprising a solid non-elastomeric continuous phase comprising an organic polymer having a glass transition temperature of at least 25° C., and having dispersed within the solid non-elastomeric continuous phase, a plurality of multi-compartment porous chemically crosslinked elastomeric particles that have a mode particle size of at least 1 µm and up to and including 10 µm.

2. The composite material of embodiment 1 that is a composite particle comprising the solid non-elastomeric continuous phase comprising the organic polymer and an external particle surface, the composite particle having a mode particle size of at least 10 µm to and including 100 µm, and having dispersed within the solid non-elastomeric continuous phase, the plurality of multi-compartment porous chemically crosslinked elastomeric particles.

3. The composite material of embodiment 1 or 2, wherein the organic polymer has a glass transition temperature of at least 40° C. and up to and including 120° C.

4. The composite material of any of embodiments 1 to 3, wherein the ratio of its loss modulus to its storage modulus at 90° C. is at least 10% less than the ratio of the loss modulus to the storage modulus at 90° C. of the organic polymer that contains none of the multi-compartment porous chemically crosslinked elastomeric particles.

5. The composite material of any of embodiments 1 to 4, wherein its fracture resistance at 20° C. is at least 10% greater than the fracture resistance of the organic polymer that contains none of the multi-compartment porous chemically crosslinked elastomeric particles.

6. The composite material of any of embodiments 1 to 5, wherein the multi-compartment porous chemically crosslinked elastomeric particles are present in an amount of at least 3 weight % and up to and including 25 weight % of the total composite material weight.

7. The composite material of any of embodiments 1 to 6, wherein the organic polymer comprises a polyester, styrene-acrylic copolymer, cellulosic polymer, polyamide, or polyimide.

8. The composite material of any of embodiments 1 to 7, wherein the multi-compartment porous chemically crosslinked elastomeric particles have a mode particle size of at least 2 µm and up to and including 8 µm, and comprise a plurality of discrete compartments that are isolated from each other and dispersed within a chemically-crosslinked organic solid phase, and the plurality of discrete compartments have an average size greater than or equal to 100 nm.

9. The composite material of any of embodiments 2 to 8 that is a composite particle further comprising flow additive particles, a surface treatment agent, spacing treatment agent particles, or a combination thereof, on its outer surface.

10. The composite material of any of embodiments 1 to 9, further comprising a colorant.

11. The composite material of embodiment 10, wherein the colorant is present only in the solid non-elastomeric continuous phase.

12. The composite material of any of embodiments 2 to 11, that is a composite particle further comprising a colorant in at least some of the multi-compartment porous chemically crosslinked elastomeric particles.

13. The composite material of any of embodiments 2 to 11 that is a composite particle further comprising a colorant in at least some compartments of the multi-compartment porous chemically crosslinked elastomeric particles.

14. The composite material of any of embodiments 1 and 3 to 11, further comprising a colorant in at least some compartments of the multi-compartment porous chemically crosslinked elastomeric particles.

15. A method for preparing composite particles of any of embodiments 2 to 13, the method comprising:

melt blending one or more non-elastomeric organic polymers having a glass transition temperature of at least 25° C. with a plurality of multi-compartment porous chemically crosslinked elastomeric particles that have a mode particle size of at least 1 μm to and including 10 μm, to form a composite blend, and grinding the composite blend to form composite particles of any of the embodiments of 2 to 13.

16. A method for forming an electrophotographic toner image, comprising:

applying a layer of composite particles of any of embodiments 2 to 13 to a substrate in an imagewise fashion to form a non-fused toner image on the substrate, applying the same composite particles one or more times on the non-fused toner image to form a multi-dimensional toner image of the composite particles, and fusing the multi-dimensional toner image of composite particles to form a fused multi-dimensional toner image on the substrate.

17. A method for forming a toner image, comprising:

applying a layer of composite particles of any of embodiments 2 to 13 to an electrostatic image on a primary toner receiver to form a non-fused toner image on the primary toner receiver, transferring the composite particles in the non-fused toner image from the primary toner receiver to a final receiver material, fusing the composite particles on the final receiver material, repeating the foregoing applying, transferring, and fusing features using the same composite particles one or more times to form a fused multi-dimensional toner image on the final receiver material.

The following Examples are provided to illustrate the practice of this invention and are not meant to be limiting in any manner.

Materials

The monomer, 2-ethylhexyl methacrylate was obtained from Sigma Aldrich Co.

The prepolymer, CN301, a polybutadiene dimethacrylate 1,6-hexanediol diacrylate ester was obtained from Sartomer USA, LLC.

Carboxy methylcellulose, MW 250K (CMC), was obtained from Acros Organics or from Ashland Aqualon as Aqualon 9M31F. These were interchangeably used.

The emulsifier, GRINDSTED® PGPR 90 (a random copolymer) was obtained from Danisco.

Nalco™ 1060 colloidal silica was obtained from Nalco Chemical Company as a 50 weight % aqueous dispersion.

Ludox™ colloidal silica was obtained from W.R Grace and Co. as a 50 weight % aqueous dispersion.

EFKA 6225 and EFKA 6220, fatty acid modified polyesters, used as shape control agents were obtained from Ciba Specialty Chemicals. The secondary shape control agent, poly(2-ethyl-2-oxazoline), was obtained from Sigma Aldrich Co.

The initiator, Vazo 52, 2,2'-azobis(2,4-dimethylvaleronitrile) was obtained from DuPont Company.

A promoter, poly(methylamino ethanol adipate) oligomer, AMAE, used to promote the adsorption of silica to droplet surface, was prepared by condensation polymerization of amino ethanol and adipic acid using known conditions.

Potassium dichromate was used to inhibit formation of water soluble polymer and was obtained from Sigma Aldrich Co.

The polyester resin Kao C can be obtained from Kao Specialties Americas LLC.

Charge control agent Bontron E-84 was obtained from Orient Chemicals.

Particles size of the elastomeric filler particles according to the present invention were measured using a Sysmex FPIA-3000 automated particle shape and size analyzer from Malvern Instruments. In this method, samples were passed through a sheath flow cell that transformed the particle suspension into narrow or flat flow, ensuring that the largest area of the particle was oriented towards the camera and that all particles were in focus. The CCD camera captured 60 images every second and these were analyzed in real time.

The larger composite toner particle diameters were measured using a Coulter Multisizer (Coulter, Inc).

Toner particles can have a range of diameters, and the standard for toner particle size is between 2 μm and 9 μm. The large diameter toner particles described below have sizes >10 μm. For convenience, the terms of toner size or toner diameter are defined in terms of the median volume weighted diameter as measured by conventional diameter measuring devices such as a Coulter Multisizer. The volume weighted diameter is the sum of the mass of each toner particle multiplied by the diameter of a spherical particle of equal mass and density, divided by the total particle mass.

Preparation of Multi-Compartment Porous Chemically Crosslinked Elastomeric P-1 Particles:

An oil phase was prepared using 22 g of CN301, 22 g of 2-ethylhexyl methacrylate, 0.88 g of PGPR, 0.44 g of Vazo 52, and 198 g of ethyl acetate. This oil phase was emulsified with 75 g of an aqueous solution of 2 weight % of carboxymethyl cellulose using a Silverson Mixer followed by homogenization in a Microfluidizer® at 9800 psi (698 kg/cm²) to yield a uniform, water-in-oil emulsion. A 250 g aliquot of this water-in-oil emulsion was emulsified with a second water phase consisting of 400 g of a 200 mmolar pH 4 citrate phosphate buffer, 16 g of Nalco™ 1060, and 2 g of a 10 weight % AMAE co-stabilizer solution in water using the Silverson Mixer fitted with a General-Purpose Disintegrating Head for two minutes at 2000 RPM, followed by homogenization in an orifice disperser at 1000 psi (71.2 kg/cm²) to form a water-in-oil-in-water emulsion.

This water-in-oil-in-water emulsion was then diluted with an equal weight of water containing 3 g of a 2.5 weight % solution of potassium dichromate in water and polymerized under nitrogen at 55° C. with stirring for 1 hour after which the ethyl acetate was removed by rotary evaporation under reduced pressure. The resulting diluted emulsion was held at 55° C. with stirring for 14 hour followed by further polymerization at 70° C. for 4 hours. The resulting multi-compartment porous chemically crosslinked elastomeric particles were isolated by filtration followed by washing with distilled water several times, re-suspended in water, and lyophilized. The multi-compartments porous chemically crosslinked elastomeric P-1 Particles were found to have a mode particle size of 6.8 μm as measured using the Sysmex. Scanning electron micrographs (SEM's) of these particles fractured in liquid nitrogen showed discrete multiple compartments within them.

Preparation of Multi-Compartment Porous Chemically Crosslinked Elastomeric P-2 Particles:

Smaller multi-compartment porous chemically crosslinked elastomeric particles were made as described for P-1 Particles except that the amount of Nalco™ 1060 used was increased to 25 g. The mode particle size was determined to be 3.9 μm.

Preparation of Control Non-Porous Chemically Crosslinked Elastomeric S Particles:

An aqueous solution was made by first dissolving 26.4 g of potassium hydrogen phthalate in 3980 g of water followed by mixing in 90 g of Ludox™, 15 g of a 10 weight % solution of AMAE co-stabilizer promoter, and 24 g of a 2.5 weight % aqueous solution of potassium dichromate. To this was added an oil phase consisting of a mixture of 400 g of CN301, 400 g of 2-ethylhexyl methacrylate, and 8 g of Vazo 52, and the resulting solution was emulsified using a Silverson mixer followed by an orifice homogenizer. The suspension of oil droplets was polymerized at 50° C. for 14 hours with stirring under nitrogen. The temperature was raised to 70° C. and held there with stirring for 4 hours. The resulting polymerized non-porous chemically crosslinked elastomeric particles were isolated by filtration, washing, and drying and found to have a mode particle size of 3.5 μm.

Comparative Example L: Non-Composite Large Toner Particles

A mixture of the toner binder polymer Kao C was first dry blended with 2 pph of Bontron E-84 in a 40 liter Henschel mixer for 60 seconds at 1000 RPM to produce a homogeneous blend. The powder blend was then melt compounded in a twin screw co-rotating extruder. Melt compounding was done at a temperature of 220° F. (76.6° C.) increasing to 220° F. (104.4° C.) in the extruder compounding zones. The cooled extrudate was then chopped to granules and pulverized in an air jet mill to the desired particle size. The toner particle size distribution and median volume weighted diameter was measured with a Coulter Counter Multisizer. The ground toner was then classified in a centrifugal air classifier to remove very small toner particles and yield toner particles of about 21 median volume weighted average diameter. The classified toner was then surface treated with fumed silica. A hydrophobic silica, designated R972 and manufactured by Nippon Aerosil and a hydrophobic titanium dioxide particle designated JMT 150IB (Tayca) were used. The toner and silica were mixed in a 10 liter Henschel mixer for 2 minutes at 2000 RPM. The silica surface treated toner was sieved through a 230 mesh vibratory sieve to remove un-dispersed silica agglomerates and any toner flakes that may have formed during the surface treatment process.

Melt Blending and Pulverizing to Form Composite Large-Toner Particles for Invention and Other Comparative Examples:

Composite toner particles of this invention and comparative toner particles were made by compounding, pulverizing and surface treating as described in this general procedure. Each embodiment of the multi-component porous chemically crosslinked elastomeric particles, and non-porous chemically crosslinked elastomeric particles was melt compounded into the continuous phase non-elastomeric organic polymer in the ratios shown below in TABLE I using a 2 roll mill at 130° C. and the resulting melt blend was then pulverized in a Wiley mill. The procedure was as follows:

Kao C, the charge control agent Bontron E-84, and the filler particles when present were weighed and blended by hand using a spatula in a container. Each lot was then compounded in 2 parts (50 g each) on roller mill under saturated steam at 20 $psi_g$ (120° C.). Compounding was continued using heat on both rollers until the material visually observed to be melted. The compounded material was pulverized in a Trost mill at 30 $psi_g$ and 1 g/min and classified to remove the small sized particles. The classified toner particles were in some cases then surface treated with 0.4% fumed silica designated RY2002L from Evonik Degussa Corp and 0.5% JMT150IB as mentioned in Comparative Example L, in a Waring Blender using large cup at 9000 RPM and 1 minute. Invention Example 1 and Comparative Example 1 were only ground in the Trost mill coarsely so the particle sizes were not determined.

TABLE I

| Example | % Filler Particles; Type of Filler Particle | % Kao C | % Bontron E-84 | Surface Treated with Fumed Silica? | Size of Composite Toner Particle (μm) |
|---|---|---|---|---|---|
| Invention Example 1 | 10 P1 | 88.2 | 1.8 | No | Not measured |
| Comparative Example 1 | None | 98.2 | 1.8 | No | Not measured |
| Invention Example 2 | 3 P2 | 95.2 | 1.8 | Yes | 15 |
| Invention Example 3 | 5 P3 | 93.2 | 1.8 | Yes | 18 |
| Invention Example 4 | 10 P4 | 88.2 | 1.8 | Yes | 16 |
| Comparative Example 2 | 10 S | 88.2 | 1.8 | Yes | 17 |

Evaluation of Physical Properties:

The following evaluations were carried out at room temperature and were useful for determining the toughness the composite particles of the present invention. The properties of high fracture resistance upon bending and high toughness of the composite particles are needed to withstand various stresses encountered during customer handling and electrophotographic use to provide toner images.

Typically, the addition of the multi-compartment porous chemically crosslinked elastomeric particles ("filler" particles) to a non-elastomeric organic polymer according to the present invention results in a reduction in indentation modulus of up to about 30% at a 10 weight % loading and a corresponding increase in the toughness or fracture resistance of the composite particles.

A probe fracture test was used to quantify the fracture properties of various particle samples. In this probe fracture test, a conical steel probe (tip diameter of 0.2 mm) was driven into the particle sample being tested at a speed of 2 mm/second and the resulting force on the probe was measured using a 5 kg load cell until complete fracture of the particle sample occurred. Since all of the particle samples had similar thicknesses, the force required to initiate fracture can be used as an indication of the relative toughness of the particle samples.

The two particle samples as evaluated were those described in the following TABLE II:

TABLE II

| Example | Filler Particle Size (μm) | Force Until Cracking Occurred (g) |
|---|---|---|
| Comparative Example 1 Kao C Control 1 (non-composite particles) | None | 547.9 |
| Invention Example 1: Composite Particles with Kao C + 10% P-1 Particles | 6.8 | 1129.8 |

The results of the probe fracture test are also illustrated in FIG. 1 wherein the Control non-composite particles showed cracking at much lower force than the composite particles of the present invention. The composite particles of the present invention therefore exhibited greater fracture resistance and toughness.

TABLE III

| Particles | Filler Particle Size (μm) | Force (g) Until Cracking Occurred |
|---|---|---|
| Comparative Example L: Non-composite large toner particles | None | 1059.4 |
| Invention Example 2: Toner binder Kao C containing 3 weight % P-2 Particles | 3.9 | 1078.0 |
| Invention Example 3: Toner binder Kao C containing 5 weight % P-2 Particles | 3.9 | 1131.9 |
| Invention Example 4: Toner binder Kao C containing 10 weight % P-2 Particles | 3.9 | 1624.9 |
| Comparative Example 2: Toner binder Kao C containing 10 weight % S Particles | 3.5 | 913.5 |

Figure 2:
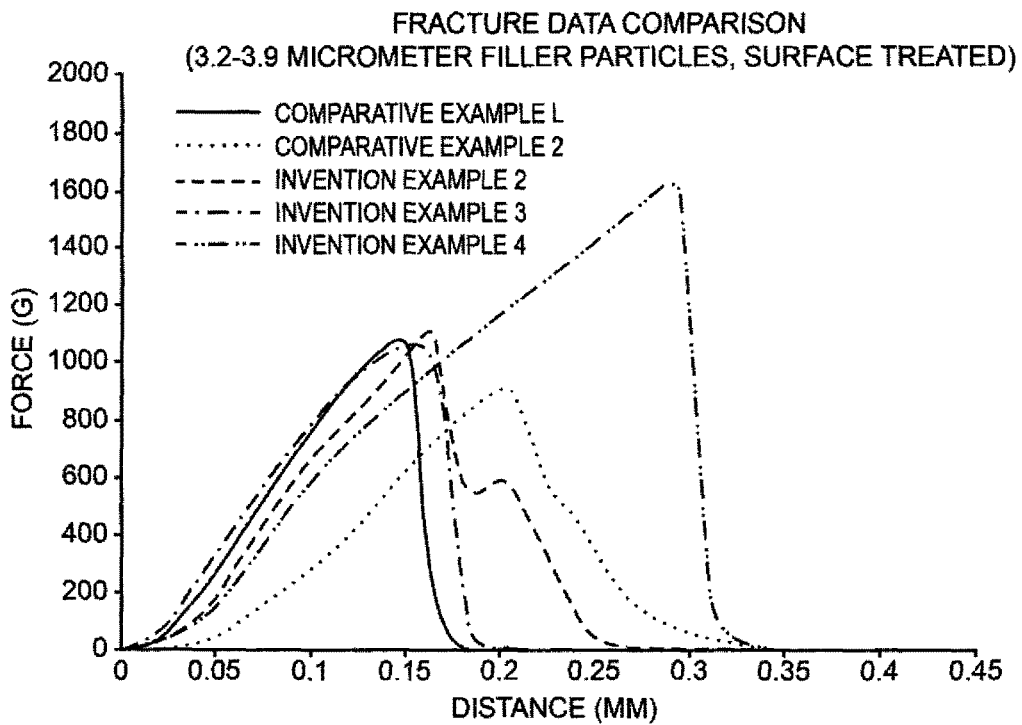
FIG. 2 is a graphical representation of fracture data (force in grams vs. distance in mm) for compression molded disks prepared from composite particles of the present invention (with surface treatment) and compression molded disks prepared from comparative particles outside the present invention, as described in Invention Examples 2, 3, and 4 presented below.

The probe fracture test results are also illustrated in FIG. 2 and it is clear that the force required to initiate cracking of the composite generally increased with the amount of P-2 Particles incorporated within the non-elastomeric organic polymer, as thus showed an improvement in fracture resistance and toughness for the materials of the present invention. The addition of 10 weight % S Particles did not have the same effect. In this case, the fracture resistance and toughness of the resulting composite was similar to, if not slightly lower, than that of the sample that did not contain any particles (Comparative Example L).

The following evaluations were carried out at elevated temperatures. These evaluations are especially useful for determining how the presence of multi-compartment, porous chemically crosslinked elastomeric particles in the composite particles affect the melt flow properties of the composite particles. This property is critical for electrophotographic fusing as well as other applications that involve thermoforming or embossing with the composite particles.

The dynamic frequency response of the toner particles in the melt state was measured in the frequency range of 100 to 0.1 radians/s at isothermal temperatures of 90° C. and 110° C. using an ARES rheometer with 25 mm parallel plate geometry and applying a strain of 10%. The results are shown in the following TABLE IV.

TABLE IV

| Particles | Particle Size (μm) | Tan Delta (Freq.- 0.1 radian/s at 90° C.) |
|---|---|---|
| Comparative Example L: Non-composite large toner particle | None | 10.8 |
| Invention Example 2 | 3.9 | 10.4 |
| Invention Example 3 | 3.9 | 8.5 |
| Invention Example 4 | 3.9 | 6.8 |
| Comparative Example 2 | 3.5 | 15.6 |

Figure 3:
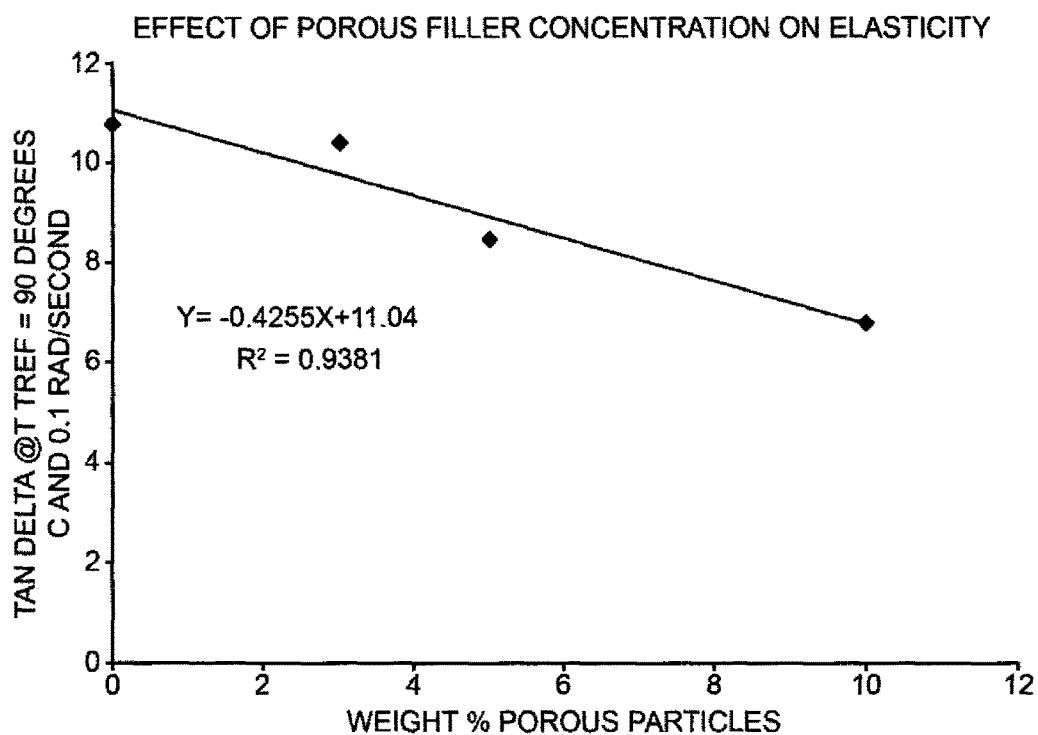
FIG. 3 is a graphical representation of the effect of using various amounts of the multi-compartment porous chemically crosslinked elastomeric particles on elasticity (tan delta) of the composite particles as described in Invention Examples 2, 3, and 4 presented below.

As shown by the data in TABLE IV, the amount of multi-compartment porous chemically crosslinked elastomeric particles in the composite particles affects composite particle elasticity and this is also illustrated in FIG. 3 whereby composite particle elasticity increases with the amount of the multi-compartment porous chemically crosslinked elastomeric particles. The addition of S particles did not have the same effect on elasticity. In this case, the degree of elasticity appeared to decrease relative to Comparative Example L.

More specifically, at a melt temperature of 90° C., the flow region was probed for each particle sample. Toner particles prepared according to the present invention exhibited higher elastic (G') and viscous (G") moduli plus lower Tan Delta across the entire frequency range as compared to the Control non-composite toner particles containing no incorporated multi-compartment porous chemically crosslinked elastomeric particles. These results indicate that any long time response of the toner particles, such as for example how they flow during and after fusing is slowed down (decreased) by the presence of the internal multi-compartment porous chemically crosslinked elastomeric particles.

The softening and flow characteristics of each composite particle sample were also measured using a Perkin-Elmer Thermomechanical Analyzer (TMA). In these experiments, a 3 mm diameter cylindrical quartz probe was placed on the surface of the composite particle sample and held there using a 50 mN load. As the composite particle sample was heated, the probe was used to monitor any changes in sample thickness that occurred as a result of the composite particle polymer flowing.

Figure 4:
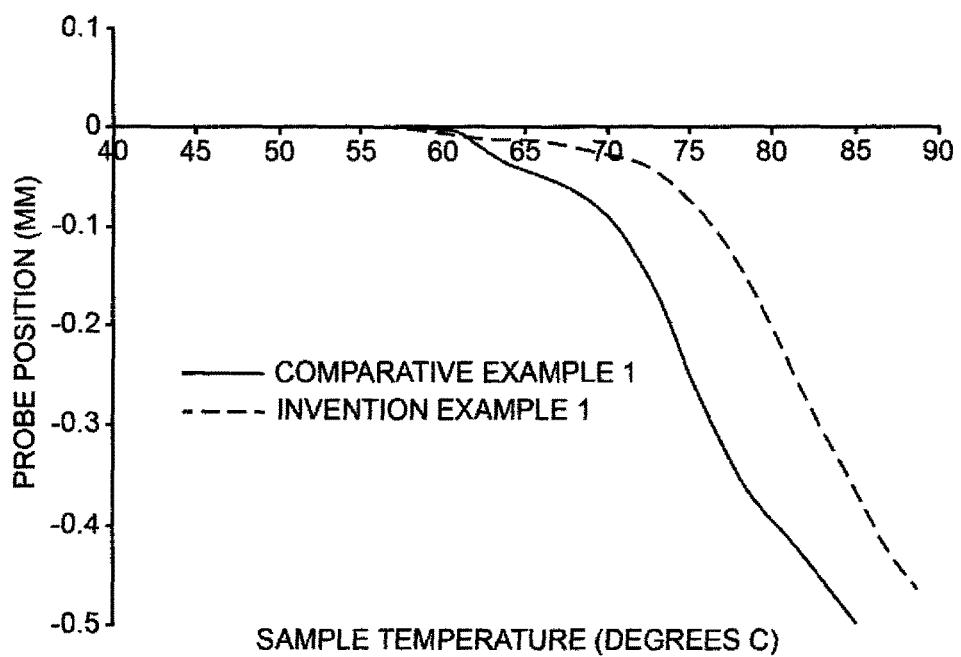
FIGS. 4 and 5 are graphical representations of softening and flow characteristics (TMA Data) for embodiments of the present invention and samples prepared from comparative particles outside the present invention as described in Invention Examples 1, 2, 3, and 4 presented below.
Figure 5:
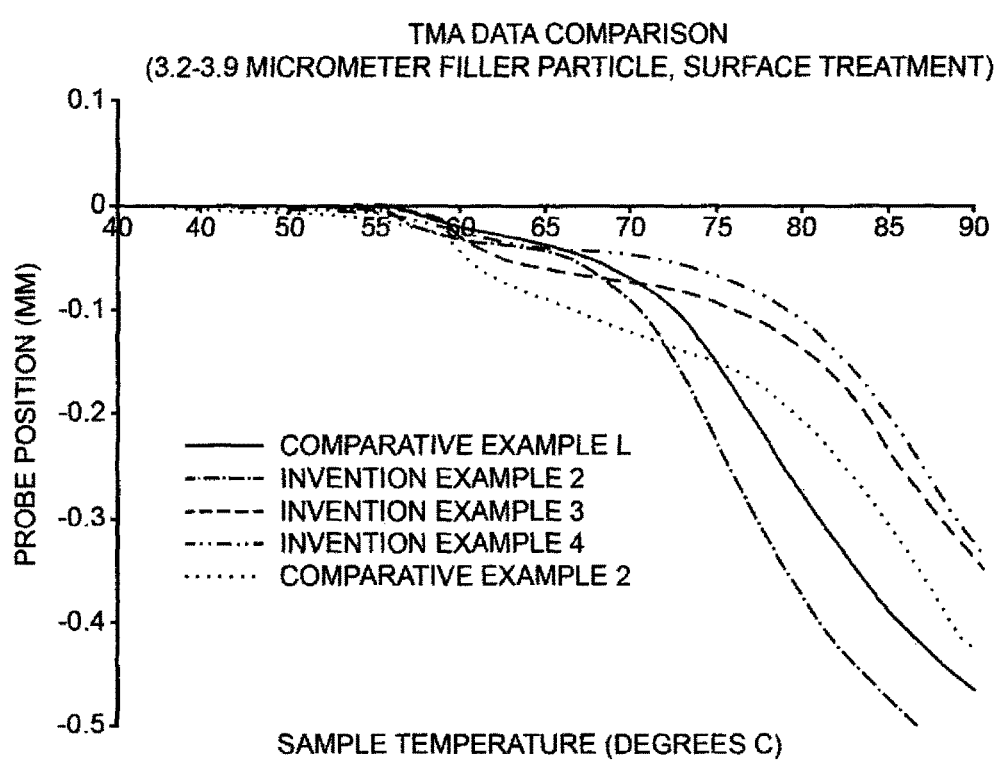

The results of these evaluations for Comparative Example 1 non-composite particles and Invention Example 1 composite particles are shown in FIG. 4 and the evaluations for Comparative Example L non-composite particles and Invention Examples 2-4 composite particles, and Comparative Example 2 composite particle with nonporous filler in FIG. 5.

The rate of probe penetration just after the glass transition temperature ($T_g$), as well as the temperature at which significant flow began to occur provided important information regarding the material flow properties. Using these metrics, it appeared that the composite particles that contained higher levels of multi-compartment porous chemically crosslinked elastomeric particles (5 weight % and 10 weight %) were more resistant to flow above the $T_g$ than the composite particles containing lower levels of the multi-compartment porous chemically crosslinked elastomeric particles or none at all. The presence of S Particles also resulted in some reduction in flow relative to Comparative Example L (higher temperature at which significant flow occurs). In this case, however, the rate of probe penetration just after the glass transition was higher, suggesting that the S Particles were not as effective at restricting flow.

The fusing behavior of various composite particles used as toner particles was also examined in a laboratory setting using a bench top fuser breadboard. Despite the fact that this bench top fuser breadboard did not exactly reproduce the fusing conditions used in commercial electrophotographic presses, it was clearly evident that the toner particles containing multi-compartment porous chemically crosslinked elastomeric particles flowed less than the particles containing no multi-compartment porous chemically crosslinked elastomeric particles. This qualitative observation is consistent with the rheology and thermal data presented above.

The invention has been described in detail with particular reference to certain preferred embodiments thereof, but it will be understood that variations and modifications can be effected within the spirit and scope of the invention.

The invention claimed is:

1. A method for preparing composite particles, the method comprising:
melt blending one or more non-elastomeric organic polymers, each having a glass transition temperature of at least 40° C. and up to and including 120° C. as measured using differential scanning calorimetry at a scanning rate of 20° C./minute, with a plurality of multi-compartment porous chemically crosslinked elastomeric particles that have a mode particle size of at least 1 μm to and including 10 μm, wherein the non-elastomeric organic polymer comprises a polyester, styrene-acrylic copolymer, cellulosic polymer, polyamide, polyimide, vinyl ester polymer, mono-olefin polymer, vinyl ether polymer, vinyl ketone polymer, or a polymer formed from one or more α-methylene aliphatic mono-carboxylic acid esters, to form a composite blend, and
grinding the composite blend to form composite particles, each composite particle comprising a solid non-elastomeric continuous phase comprising the non-elastomeric organic polymer and an external particle surface, the composite particle having a mode particle size of at least 10 μm to and including 100 μm, and having dispersed within the solid non-elastomeric continuous phase, a plurality of the multi-compartment porous chemically crosslinked elastomeric particles that have a mode particle size of at least 1 μm to and including 10 μm.

2. A method for forming an electrophotographic toner image, comprising:
applying a layer of composite particles to a substrate in an imagewise fashion to form a non-fused toner image on the substrate,
applying the same composite particles one or more times on the non-fused toner image to form a multi-dimensional toner image of the composite particles, and
fusing the multi-dimensional toner image of composite particles to form a fused multi-dimensional toner image on the substrate,
wherein each composite particle comprises a solid non-elastomeric continuous phase comprising an organic polymer having a glass transition temperature of at least 40° C. and up to and including 120° C. as measured using differential scanning calorimetry at a scanning rate of 20° C./minute, and an external particle surface, the composite particle having a mode particle size of at least 10 μm to and including 100 and having dispersed within the solid continuous phase, a plurality of multi-compartment porous chemically crosslinked elastomeric particles that have a mode particle size of at least 1 μm to and including 10 μm, wherein the organic polymer comprises a polyester, styrene-acrylic copolymer, cellulosic polymer, polyamide, polyimide, vinyl ester polymer, mono-olefin polymer, vinyl ether polymer, vinyl ketone polymer, or a polymer formed from one or more α-methylene aliphatic mono-carboxylic acid esters.

3. The method of claim 2, wherein the fracture resistance of each composite particle at 20° C. is at least 10% greater than the fracture resistance of the organic polymer that contains none of the multi-compartment porous chemically crosslinked elastomeric particles.

4. The method of claim 2, wherein the multi-compartment porous chemically crosslinked elastomeric particles are present in an amount of at least 3 weight % and up to and including 25 weight % of the total composite material weight.

5. The method of claim 2, wherein the organic polymer comprises a polyester, styrene-acrylic copolymer, cellulosic polymer, polyamide, or polyimide.

6. The method of claim 2, wherein the multi-compartment porous chemically crosslinked elastomeric particles have a mode particle size of at least 2 μm and up to and including 8 μm, and comprise a plurality of discrete compartments that are isolated from each other and dispersed within a chemically-crosslinked organic solid phase, and the plurality of discrete compartments have an average size greater than or equal to 100 nm.

7. The method of claim 2, wherein each composite particle further comprises a colorant.

8. The method of claim 7, wherein the colorant is present only in the solid non-elastomeric continuous phase.

9. The method of claim 2, wherein each composite particle further comprises a colorant in at least some of the multi-compartment porous chemically crosslinked elastomeric particles.

10. The method of claim 2, wherein each composite particle further comprises a colorant in at least some compartments of the multi-compartment porous chemically crosslinked elastomeric particles.

11. The method of claim 2, wherein the organic polymer comprises a polyester.

12. A method for forming a toner image, comprising:
applying a layer of composite particles to an electrostatic image on a primary toner receiver to form a non-fused toner image on the primary toner receiver,
transferring the composite particles in the non-fused toner image from the primary toner receiver to a final receiver material,
fusing the composite particles on the final receiver material,
repeating the foregoing applying, transferring, and fusing features using the same composite particles one or more times to form a fused multi-dimensional toner image on the final receiver material,
wherein each composite particle comprises a solid non-elastomeric continuous phase comprising an organic polymer having a glass transition temperature of at least 40° C. and up to and including 120° C. as measured using differential scanning calorimetry at a scanning rate of 20° C./minute, and an external particle surface, the composite particle having a mode particle size of at least 10 μm to and including 100 μm, and having dispersed within the solid continuous phase, a plurality of multi-compartment porous chemically crosslinked elastomeric particles that have a mode particle size of at least 1 μm to and including 10 μm,
wherein the organic polymer comprises a polyester, styrene-acrylic copolymer, cellulosic polymer, polyamide, polyimide, vinyl ester polymer, mono-olefin polymer, vinyl ether polymer, vinyl ketone polymer, or a polymer formed from one or more α-methylene aliphatic mono-carboxylic acid esters.

* * * * *